US008903625B2

(12) United States Patent
Kidokoro et al.

(10) Patent No.: US 8,903,625 B2

(45) Date of Patent: Dec. 2, 2014

(54) AIR-FUEL RATIO IMBALANCE AMONG CYLINDERS DETERMINING APPARATUS FOR A MULTI-CYLINDER INTERNAL COMBUSTION ENGINE

(75) Inventors: Toru Kidokoro, Hadano (JP); Hiroshi Sawada, Gotenba (JP); Yasushi Iwazaki, Ebina (JP); Fumihiko Nakamura, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 849 days.

(21) Appl. No.: 13/133,044

(22) PCT Filed: Dec. 5, 2008

(86) PCT No.: PCT/JP2008/072591

§ 371 (c)(1), (2), (4) Date: Oct. 24, 2011

(87) PCT Pub. No.: WO2010/064331

PCT Pub. Date: Jun. 10, 2010

(65) Prior Publication Data

US 2012/0035831 A1 Feb. 9, 2012

(51) Int. Cl.

| | |
|---|---|
| ***G06F 7/00*** | (2006.01) |
| ***F02D 41/00*** | (2006.01) |
| *F02D 41/14* | (2006.01) |

(52) U.S. Cl.

CPC ........ *F02D 41/1441* (2013.01); *F02D 41/0085* (2013.01); *F02D 2041/1418* (2013.01)

USPC ............ 701/103; 701/104; 123/673; 123/703

(58) Field of Classification Search

CPC .......... F02D 41/1441; F02D 2041/147; F02D 41/1495; F02D 41/1454; F02D 2041/1418; F02D 41/0085; Y02T 10/47; F01N 11/007; F01N 2560/024; F01N 2560/025; F01N 2560/14; G01N 27/4071

USPC ................................ 701/103, 104, 109, 114; 123/179.13–179.16, 672, 673, 123/691–692, 703, 704; 60/274, 276, 299; 204/431; 73/23.31, 114.69, 114.7, 73/114.71, 114.72, 114.73, 114.75

See application file for complete search history.

(56) References Cited

U.S. PATENT DOCUMENTS

| | | | | |
|---|---|---|---|---|
| 7,597,091 | B2 * | 10/2009 | Suzuki et al. | 123/673 |
| 7,950,269 | B2 * | 5/2011 | Maeda et al. | 73/23.32 |

(Continued)

FOREIGN PATENT DOCUMENTS

| | | |
|---|---|---|
| DE | 10 2006 000 347 A1 | 2/2007 |
| JP | A-6-10738 | 1/1994 |

(Continued)

OTHER PUBLICATIONS

Feb. 24, 2009 International Search Report issued in International Application No. PCT/JP2008/072591 (with translation).

*Primary Examiner* — Erick Solis

*Assistant Examiner* — Carl Staubach

(74) *Attorney, Agent, or Firm* — Oliff PLC

(57) ABSTRACT

A judging device comprises a catalyst, an upstream air/fuel ratio sensor having an air/fuel ratio sensing element covered with a diffusion resistance layer, and a downstream air/fuel ratio sensor. The judging device performs main feedback control to equalize the air/fuel ratio indicated by the output value of the upstream air/fuel ratio sensor to an upstream target air/fuel ratio and sub-feedback control to equalize the output value of the downstream air/fuel ratio sensor to a downstream target value. The judging device acquires "an imbalance judging parameter" which increases with "the increase of the difference between the amount of hydrogen contained in the exhaust gas before the exhaust gas passes through the catalyst and that after the exhaust gas passes through the catalyst" according to the sub-feedback amount. When the imbalance judging parameter is larger than an abnormality judgment threshold, the judging device judges that an air/fuel ratio imbalance among the cylinders has occurred. The judging device does not make judgment on air/fuel ratio imbalance among the cylinders if a predetermined judgment prohibition condition is satisfied, for example, if the flow of the exhaust gas is a predetermined value or more.

15 Claims, 10 Drawing Sheets

(56) References Cited

U.S. PATENT DOCUMENTS

| | | | | |
|---|---|---|---|---|
| 8,670,917 | B2 * | 3/2014 | Aoki et al. .................... | 701/104 |
| 8,744,729 | B2 * | 6/2014 | Iwazaki et al. ................ | 701/109 |
| 2007/0017210 | A1 | 1/2007 | Hirata et al. | |
| 2008/0040018 | A1 | 2/2008 | Katoch | |
| 2009/0056686 | A1 | 3/2009 | Suzuki | |
| 2010/0168986 | A1 | 7/2010 | Iwazaki et al. | |
| 2010/0191444 | A1 | 7/2010 | Aoki | |

FOREIGN PATENT DOCUMENTS

| | | |
|---|---|---|
| JP | A-11-72473 | 3/1999 |
| JP | A-2000-65782 | 3/2000 |
| JP | A-2000-220489 | 8/2000 |
| JP | A-2001-132498 | 5/2001 |
| JP | A-2002-266682 | 9/2002 |
| JP | A-2003-336535 | 11/2003 |
| JP | A-2004-36475 | 2/2004 |
| JP | A-2004-69547 | 3/2004 |
| JP | A-2007-23917 | 2/2007 |
| JP | A-2007-77869 | 3/2007 |
| JP | A-2007-146661 | 6/2007 |
| JP | A-2007-154840 | 6/2007 |
| JP | A-2007-162565 | 6/2007 |
| JP | A-2007-239700 | 9/2007 |
| JP | A-2008-38785 | 2/2008 |
| JP | A-2009-13967 | 1/2009 |
| JP | A-2009-30455 | 2/2009 |

* cited by examiner

AIR-FUEL RATIO IMBALANCE AMONG CYLINDERS DETERMINING APPARATUS FOR A MULTI-CYLINDER INTERNAL COMBUSTION ENGINE

TECHNICAL FIELD

The present invention relates to "an air-fuel ratio imbalance among cylinders determining apparatus for a multi-cylinder internal combustion engine", which is applied to the multi-cylinder internal combustion engine, and which can determine (or monitor, detect) whether or not an imbalance among each of air-fuel ratios of each of air-fuel mixtures supplied to each of cylinders (i.e., an air-fuel ratio imbalance among the cylinders, variation in air-fuel ratios among the cylinders, or air-fuel ratio non-uniformity among the cylinders) becomes excessively large.

BACKGROUND ART

Conventionally, an air-fuel ratio control apparatus has been widely known, which comprises a three-way catalytic converter disposed in an exhaust passage of an internal combustion engine, and an upstream air-fuel ratio sensor and a downstream air-fuel ratio sensor disposed upstream and downstream of the three-way catalytic converter, respectively. The air-fuel ratio control apparatus performs a feedback control of an air-fuel ratio (an air-fuel ratio of the engine) of a mixture supplied to the engine based on the output value of the upstream air-fuel ratio sensor and the output value of the downstream air-fuel ratio sensor in such a manner that the air-fuel ratio of the engine coincides with a stoichiometric air-fuel ratio.

This type of air-fuel ratio control apparatus controls the air-fuel ratio of the engine utilizing a control amount (an air-fuel ratio feedback amount) commonly used among all of the cylinders. That is, the air-fuel ratio feedback control is performed in such a manner that an average (value) of the air-fuel ratio of the air-fuel mixture supplied to the entire engine becomes equal to the stoichiometric air-fuel ratio.

For example, when a measured value or an estimated value of an intake air amount of the engine differs from "a true intake air amount", each of the air-fuel ratios of each of the cylinders deviates from the stoichiometric air-fuel ratio toward a rich side or a lean side with respect to the stoichiometric air-fuel ratio without exception. In this case, the conventional air-fuel ratio control changes the air-fuel ratio of the air-fuel mixture supplied to the engine to "a leaner side or a richer side". Consequently, the air-fuel mixture supplied to each of the cylinders is adjusted to coincide with an air-fuel ratio close to the stoichiometric air-fuel ratio. Accordingly, a combustion in each of the cylinders comes close to a perfect combustion (a combustion occurring when the air-fuel ratio of the mixture is equal to the stoichiometric air-fuel ratio), and an air-fuel ratio of an exhaust gas flowing into the three-way catalytic converter coincides with the stoichiometric air-fuel ratio or with an air-fuel ratio close to the stoichiometric air-fuel ratio. As a result, the deterioration of emission can be avoided.

Meanwhile, an electronic control fuel injection type internal combustion engine typically comprises one fuel injector in each of the cylinders or in each of intake ports, each communicating with each of the cylinders. Accordingly, when a characteristic of the injector for a specific cylinder becomes "a characteristic that the injector injects fuel in an amount larger (more excessive) than an instructed fuel injection amount", only an air-fuel ratio (air-fuel-ratio-of-the-specific-cylinder) of a mixture supplied to the specific cylinder shifts to an extremely richer side. That is, a non-uniformity among air-fuel ratios of the cylinders (a variation in air-fuel ratios among the cylinders, air-fuel ratio imbalance among the cylinders) becomes large. In other words, there arises an imbalance among air fuel ratios, each of which is an air-fuel ratio of a mixture supplied to each of a plurality of the cylinders.

In this case, the average of the air-fuel ratios of the mixtures supplied to the entire engine becomes an air-fuel ratio richer (smaller) than the stoichiometric air-fuel ratio. Accordingly, the feedback amount commonly used to all of the cylinders causes the air-fuel ratio of the specific cylinder to shifts to a leaner (larger) air-fuel ratio so that the air-fuel ratio of the specific cylinder is made closer to the stoichiometric air-fuel ratio. However, the air-fuel ratio of the specific cylinder is still considerably richer (smaller) than the stoichiometric air-fuel ratio. Further, the air-fuel ratios of the other cylinders are caused to shift to a leaner (larger) air-fuel ratio so that the air-fuel ratios of the other cylinders are caused to deviate more from the stoichiometric air-fuel ratio. At this time, since the number of the other cylinders is larger than the number (one) of the specific cylinder, the air-fuel ratios of the other cylinders are caused to change to an air-fuel ratio slightly leaner (larger) than the stoichiometric air-fuel ratio. As a result, the average of the air-fuel ratios of the mixtures supplied to the engine is caused to become roughly equal to the stoichiometric air-fuel ratio.

However, the air-fuel ratio of the specific cylinder is still richer (smaller) than the stoichiometric air-fuel ratio, and the air-fuel ratios of the other cylinders are still leaner (larger) than the stoichiometric air-fuel ratio, and therefore, a combustion condition of the mixture in each of the cylinders is different from the perfect combustion. As a result, an amount of emissions (an amount of unburnt substances and/or an amount of nitrogen oxides) discharged from each of the cylinders increases. Accordingly, although the average of the air-fuel ratios of the mixtures supplied to the engine coincides with the stoichiometric air-fuel ratio, the three-way catalytic converter may not be able to purify the increased emissions, and thus, there is a possibility that the emissions become worse. It is therefore important to detect whether or not the air-fuel ratio non-uniformity among cylinders becomes excessively large, since an appropriate measure can be taken in order not to worsen the emissions.

One of such conventional apparatuses (the air-fuel ratio imbalance among cylinders determining apparatuses) that determines "whether or not the non-uniformity of the air-fuel ratios among cylinders (the air-fuel ratio imbalance among cylinders, an imbalance among air-fuel ratios of individual cylinders) becomes excessively large" obtains an estimated air-fuel ratio representing each of the air-fuel ratios of each of the cylinders by analyzing an output of a single air-fuel ratio sensor disposed at an exhaust gas aggregated portion. The conventional apparatus determines whether or not "the non-uniformity of the air-fuel ratios among cylinders" becomes excessively large based on the estimated air-fuel ratio of each of the cylinders (refer to, for example, Japanese Patent Application Laid-Open (kokai) No. 2000-220489).

SUMMARY OF THE INVENTION

However, the conventional apparatus needs to detect, within a short time, the air-fuel ratio of the exhaust gas which varies in accordance with an engine rotation. This requires an air-fuel ratio sensor having an extremely high responsibility. Further, there arises a problem that the apparatus can not estimate the air-fuel ratio of each of the cylinders with high accuracy, when the air-fuel ratio sensor is deteriorated, because a responsibility of the deteriorated air-fuel ratio sensor is low. In addition, it is not easy to separate a noise from the variation in the air-fuel ratio. Furthermore, a high-speed data sampling technique and a high-performance CPU having a high processing ability are required. As described above, the conventional apparatus has a number of problems to be solved.

Accordingly, one of objects of the present invention is to provide "an air-fuel ratio imbalance among cylinders determining apparatus of practical use", which is capable of determining whether or not "the non-uniformity (imbalance) of the air-fuel ratios among the cylinders" becomes excessively large, with high accuracy (precision).

The air-fuel ratio imbalance among cylinders determining apparatus according to the present invention is applied to the multi cylinder engine having a plurality of cylinders. The air-fuel ratio imbalance among cylinders determining apparatus comprises a catalytic converter, an upstream air-fuel ratio sensor, a downstream air-fuel ratio sensor, air-fuel ratio feedback control means, imbalance determining parameter obtaining means for obtaining an imbalance determining parameter, air-fuel ratio imbalance among cylinders determining means, and determining prohibiting means.

The catalytic converter is a catalytic unit (catalyst) which oxidizes at least hydrogen among components included in an exhaust gas discharged from the engine. For example, the catalytic converter may be a catalytic converter (typically, the three-way catalytic converter) disposed in an exhaust passage of the engine at a position downstream of the exhaust gas aggregated portion. Alternatively, the catalytic converter may be a catalytic element provided to cover the downstream air-fuel ratio sensor.

The upstream air-fuel ratio sensor includes a diffusion resistance layer with which an exhaust gas which has not passed through the catalytic converter contacts, and an air-fuel ratio detecting element which is covered with (by) the diffusion resistance layer and outputs an output value according to an air-fuel ratio of an exhaust gas which has reached the detecting elements after passing through the diffusion resistance layer.

One of examples of the upstream air-fuel ratio sensor is "a wide range air-fuel ratio sensor having the diffusion resistance layer" described in, for example, Japanese Patent Application Laid-Open (kokai) No. Hei 11-72473, Japanese Patent Application Laid-Open No. 2000-65782, and Japanese Patent Application Laid-Open No. 2004-69547, etc. That is, the example of the upstream air-fuel ratio sensor includes a solid electrolyte layer, an exhaust-gas-side electrode layer, an atmosphere-side electrode layer exposed in a space into which an atmosphere is introduced, and a diffusion resistance layer, and is a sensor wherein the exhaust-gas-side electrode layer and the atmosphere-side electrode layer are formed on both surfaces of the solid electrolyte layer in such a manner that the exhaust-gas-side electrode layer and the atmosphere-side electrode layer oppose to each other to sandwich the solid electrolyte layer therebetween, and the exhaust-gas-side electrode layer is covered with (by) the diffusion resistance layer. In this sensor, the solid electrolyte layer, the exhaust-gas-side electrode layer, and the atmosphere-side electrode layer constitute "the air-fuel ratio detecting element".

The above described air-fuel ratio sensor outputs the output value varying depending upon "an concentration of oxygen at the exhaust-gas-side electrode layer" of a gas reaching the exhaust-gas-side electrode layer (the air-fuel ratio detecting element) after passing through the diffusion resistance layer, when an air-fuel ratio of the gas to be detected is leaner than the stoichiometric air-fuel ratio. Further, the air-fuel ratio sensor of the kind outputs the output value varying depending upon "an concentration of unburnt substances" of the gas reaching the exhaust-gas-side electrode layer (the air-fuel ratio detecting element) after passing through the diffusion resistance layer, when the air-fuel ratio of the gas to be detected is richer than the stoichiometric air-fuel ratio. That is, the air-fuel ratio sensor of the kind outputs the output value according to the air-fuel ratio of the exhaust gas reaching the air-fuel detecting element after passing through the diffusion resistance layer, irrespective of whether the air-fuel ratio of the gas to be detected is rich or lean The downstream air-fuel ratio sensor is a sensor outputting an output value according to an air-fuel ratio of an exhaust gas which has passed through the catalytic converter.

The air-fuel ratio feedback control means performs a feedback control on an air-fuel ratio of a mixture supplied to the engine in such a manner that an air-fuel ratio represented by the output value of the upstream air-fuel ratio sensor coincides with a certain target upstream-side air-fuel ratio. The target upstream-side air-fuel ratio is preferably the stoichiometric air-fuel ratio, however, may be an air-fuel ratio other than the stoichiometric air-fuel ratio. For example, the target upstream-side air-fuel ratio may be an air-fuel ratio which alternately changes between a richer air-fuel ratio and a lean air-fuel ratio with respect to time and of which average is equal to the stoichiometric air-fuel ratio.

As described above, the air-fuel ratio feedback control means performs the feedback control on the air-fuel ratio of the mixture supplied to the engine (e.g., an fuel supply amount) in such a manner that the air-fuel ratio represented by the output value of the upstream air-fuel ratio sensor coincides with the certain target upstream-side air-fuel ratio. Accordingly, if the air-fuel ratio represented by the output value of the upstream air-fuel ratio sensor coincides with a true average (true average of the air-fuel ratio with respect to time) of the air-fuel ratio of the mixture supplied to the entire engine, the true average of the air-fuel ratio of the mixture supplied to the entire engine is caused to coincide with the target upstream-side air-fuel ratio.

However, in practice, when the air-fuel ratio imbalance among the cylinders becomes excessively large, the true average (true average of the air-fuel ratio with respect to time) of the air-fuel ratio of the mixture supplied to the entire engine may sometimes be controlled to be an air-fuel ratio leaner than the target upstream-side air-fuel ratio. The reason for this is as follows.

The fuel supplied to the engine is a chemical compound of carbon and hydrogen. Accordingly, when the air-fuel ratio of the mixture for the combustion is richer than the stoichiometric air-fuel ratio, "carbon hydride HC, carbon monoxide CO, and hydrogen $H_2$, and so on" are generated as intermediate products. A probability that the intermediate products meet and bind with oxygen greatly decreases during the combustion, as the air-fuel ratio of the mixture for the combustion deviates more from the stoichiometric air-fuel ratio in the richer side than the stoichiometric air-fuel ratio. As a result, an amount of the unburnt substances (HC, CO, and $H_2$) drastically (e.g., in a quadratic function fashion) increases as the air-fuel ratio of the mixture supplied to the cylinder becomes richer (refer to FIG. 8).

Here, it is assumed that the air-fuel ratio of a specific cylinder greatly deviates to the richer side (becomes richer). This state occurs, for example, when the fuel injection characteristic of the fuel injector provided for the specific cylinder becomes "the characteristic that the injector injects the fuel in an amount larger (more excessive) than the instructed fuel injection amount".

In the case described above, the air-fuel ratio (the air-fuel ratio of the specific cylinder) of the mixture supplied to the specific cylinder greatly changes (shifts) to the richer air-fuel ratio (smaller air-fuel ratio), compared with the air-fuel ratio (the air fuel ratio of the other cylinders) of the mixture supplied to the rest of the cylinders. That is, the air-fuel ratio imbalance among cylinders occurs. At this time, an extremely large amount of the unburnt substances (HC, CO, and $H_2$) is discharged from the specific cylinder.

In the mean time, hydrogen $H_2$ is a small molecule, compared with carbon hydride HC and carbon monoxide CO. Accordingly, hydrogen $H_2$ rapidly diffuses through the diffusion resistance layer of the upstream air-fuel ratio sensor, compared to the other unburnt substances (HC, CO). Therefore, when a large amount of the unburnt substances including HC, CO, and $H_2$ are generated, a preferential diffusion of hydrogen $H_2$ occurs in the diffusion resistance layer. That is, hydrogen $H_2$ reaches the surface of the air-fuel detecting element in a larger amount compared with "the other unburnt substances (HC, CO)". As a result, a balance between a concentration of hydrogen $H_2$ and a concentration of the other unburnt substances (HC, CO) is lost. In other words, a fraction of hydrogen $H_2$ to all of the unburnt substances included in the exhaust gas reaching the air-fuel ratio detecting element of the upstream air-fuel ratio sensor greatly differs from a fraction of hydrogen $H_2$ to all of the unburnt substances included in the exhaust gas discharged from the engine.

This causes the air-fuel ratio represented by the upstream air-fuel ratio sensor to be richer than the true average of the air-fuel ratio of the mixture supplied to the entire engine (i.e. the true air-fuel ratio of the exhaust gas discharged from the engine) owing to the preferential diffusion of hydrogen $H_2$.

For example, it is assumed that an air-fuel ratio A0/F0 is equal to the stoichiometric air-fuel ratio (e.g., 14.5), when the intake air amount (weight) introduced into each of the cylinders of the 4-cylinder engine is A0, and the fuel amount (weight) supplied to each of the cylinders is F0. Further, for convenience of description, it is assumed that the target upstream-side air-fuel ratio is equal to the stoichiometric air-fuel ratio.

Under these assumptions, it is further assumed that an amount of fuel supplied (injected) to each of the cylinders is uniformly excessive in 10%. That is, it is assumed that the fuel of 1.1·F0 is supplied to each of the cylinder. Here, a total amount of the intake air supplied to the four cylinders (an intake amount supplied to the entire engine during a period in which each and every cylinder completes one combustion stroke) is equal to 4·A0, and a total amount supplied to the four cylinders (a fuel amount supplied to the entire engine during the period in which each and every cylinder completes one combustion stroke) is equal to 4.4·F0 (=1.1·F0+1.1·F0+1.1·F0+1.1·F0). Accordingly, a true average of the air-fuel ratio of the mixture supplied to the entire engine is 4·A0/(4.4·F0)=A0/(1.1·F0). At this time, the output value of the upstream air-fuel ratio sensor becomes an output value corresponding to the air-fuel ratio A0/(1.1·F0). The air-fuel ratio of the mixture supplied to the entire engine therefore is caused to coincide with the stoichiometric air-fuel ratio which is the target upstream-side air-fuel ratio by the air-fuel ratio feedback control. In other words, the fuel amount supplied to each of the cylinders is decreased in 10% by the air-fuel ratio feedback control. That is, the fuel of 1·F0 is again supplied to each of the cylinders, and the air-fuel ratio of each of the cylinders coincides with the stoichiometric air fuel ratio A0/F0.

Next, it is assumed that an amount of fuel supplied to one certain specific cylinder is excessive in 40% (i.e., 1.4·F0), and an amount of fuel supplied to each of the other three cylinders is an appropriate amount (a fuel amount required to obtain the stoichiometric air-fuel ratio which is the target upstream-side air fuel ratio, here F0). Under this assumption, a total amount of the intake air supplied to the four cylinders is equal to 4·A0. A total amount of the fuel supplied to the four cylinders is equal to 4.4·F0 (=1.4·F0+F0+F0+F0). Accordingly, the true average of the air-fuel ratio of the mixture supplied to the entire engine is 4·A0/(4.4·F0)=A0/(1.1·F0). That is, the true average of the air-fuel ratio of the mixture supplied to the entire engine is the same as the value obtained "when the amount of fuel supplied to each of the cylinders is uniformly excessive in 10%" as described above.

However, as described above, the amount of the unburnt substances (HC, CO, and $H_2$) drastically increases as the air-fuel ratio of the mixture supplied to the cylinder becomes richer. Further, the exhaust gas in which the exhaust gases from the cylinders are mixed reaches the upstream air-fuel ratio sensor. Accordingly, "the amount of hydrogen $H_2$ included in the exhaust gas in the above described case in which the amount of fuel supplied to the specific cylinder becomes excessive in 40%" is considerably greater than "the amount of hydrogen $H_2$ included in the exhaust gas in the case in which the amount of fuel supplied to each of the cylinders uniformly becomes excessive in 10%".

As a result, due to "the preferential diffusion of hydrogen $H_2$" described above, the air-fuel ratio represented by the output value of the upstream air-fuel ratio sensor becomes richer than "the true average (A0/(1.1·F0)) of the air-fuel ratio of the mixture supplied to the entire engine". That is, even when the average of the air-fuel ratio of the exhaust gas is the same richer air-fuel ratio, the concentration of hydrogen $H_2$ in the exhaust gas reaching the air-fuel ratio detecting element of the upstream air-fuel ratio sensor when the air-fuel ratio imbalance among cylinders is occurring becomes greater than when the air-fuel ratio imbalance among cylinders is not occurring. Accordingly, the output value of the upstream air-fuel ratio sensor becomes a value indicating an air-fuel ratio richer than the true average of the air-fuel ratio of the mixture.

Consequently, by the air-fuel ratio feedback control, the true average of the air-fuel ratio of the mixture supplied to the entire engine is caused to be leaner than the target upstream-side air-fuel ratio. This is the reason why the true average of the air-fuel ratio is controlled to be leaner when the non-uniformity of the air-fuel ratio among cylinders becomes excessive.

On the other hand, hydrogen $H_2$ included in the exhaust gas discharged from the engine is oxidized (purified) together with the other unburnt substances (HC, CO) in the catalytic converter. Further, the exhaust gas which has passed through the catalytic converter reaches the downstream air-fuel ratio sensor. Accordingly, the output value of the downstream air-fuel ratio sensor becomes a value corresponding to the average of the true air-fuel ratio of the mixture supplied to the engine. Therefore, when only the air-fuel ratio of the specific cylinder deviates to the richer side, the output value of the downstream air-fuel ratio sensor becomes a value corresponding to the true air-fuel ratio which is excessively corrected so as to be the leaner side by the air-fuel ratio feedback control. That is, as the air-fuel ratio of the specific cylinder deviates to the richer side, "the true air-fuel ratio of the mixture supplied to the engine" is controlled to be leaner owing to "the preferential diffusion of hydrogen $H_2$" and "the air-fuel ratio feedback control", and the resultant appears in the output value of the downstream air-fuel ratio sensor. In other words, the output value of the downstream air-fuel ratio sensor varies depending upon a degree of the air-fuel ratio imbalance among cylinders.

In view of the above, the imbalance determining means is configured so as to obtain "the imbalance determining parameter" based on "the output value of the downstream air-fuel ratio sensor when the air-fuel ratio feedback control is being performed". The imbalance determining parameter is a value varying depending upon "the true air-fuel ratio of the mixture supplied to the entire engine" which is varied by the above described air-fuel ratio feedback control, and is also a value which increases as "the difference between an amount of hydrogen included in the exhaust gas which has not passed through the catalytic converter and an amount of hydrogen included in the exhaust gas which has passed through the catalytic converter" becomes larger.

Further, the air-fuel ratio imbalance among cylinders determining means is configured so as to determine that the imbalance is occurring among "the air-fuel ratios of each of the individual cylinders, each of the air-fuel ratios of each of the individual cylinder being an air-fuel ratio of the mixture supplied to each of the cylinder" (i.e., the air-fuel ratio imbalance among cylinders is occurring) when the obtained imbalance determining parameter is larger than the abnormality determining threshold. As a result, the air-fuel ratio imbalance among cylinders determining apparatus according to the present invention can determine whether or not the air-fuel ratio imbalance among cylinders is occurring with high accuracy.

Meanwhile, the inventors have found that the accuracy of the determination is not high, if the air-fuel ratio imbalance determination among cylinders described above is carried out, for example, in cases in which the catalytic converter can not exhibit its desired purifying performance (ability to oxidize hydrogen), hydrogen is generated in a large amount due to reasons other than the air-fuel ratio imbalance among cylinders, an amount of oxygen included in the exhaust gas is greater than expected, hydrogen included in the exhaust gas slips through the catalytic converter when an amount of the exhaust gas is too great although the catalytic converter exhibits its desired purifying performance, and so on.

In view of the above, the air-fuel ratio imbalance among cylinders determining apparatus according to the present invention comprises the determining prohibiting means. The determining prohibiting means determines whether or not "a condition under which the accuracy of the determination becomes lower" is satisfied, i.e., it determines whether or not "a predetermined determining prohibiting condition" is satisfied. The determining prohibiting means prohibits the determination (the air-fuel ratio imbalance among cylinders determination) performed by the air-fuel ratio imbalance among cylinders determining means. As a result, the possibility of erroneous determination (decision) as to whether or not the air-fuel ratio imbalance among cylinders is occurring can be decreased.

One of aspects of the air-fuel ratio imbalance among cylinders determining apparatus according to the present invention, the determining prohibiting condition is defined to be satisfied when an engine operating state is in a state in which "the amount of the oxygen included in the exhaust gas discharged from the engine is equal to or greater than an oxygen amount threshold".

When the engine operating state is in "the state in which the amount of the oxygen included in the exhaust gas discharged from the engine is equal to or greater than the oxygen amount threshold", "oxidization of hydrogen included in the exhaust gas" is expedited greatly than expected before the exhaust gas discharged from the engine reaches the upstream air-fuel ratio sensor, owing to the excessive oxygen included in the exhaust gas. When "the oxidization of hydrogen included in the exhaust gas" is performed greatly than expected, the air-fuel ratio represented by the output value of the upstream air-fuel ratio sensor becomes an air-fuel ratio close to "the true average of the air-fuel ratio of the mixture supplied to the entire engine", even when the air-fuel ratio imbalance among cylinders is occurring (i.e., a large amount of hydrogen $H_2$ is discharged only from the specific cylinder). As a result, the imbalance determining parameter obtained based on the output value of the downstream air-fuel ratio sensor becomes a value which does not represent the degree of the air-fuel ratio imbalance among cylinders. Accordingly, as the above configuration, if the determining prohibiting condition is designed to be satisfied "when the engine operating state is in the state in which the amount of the oxygen included in the exhaust gas discharged from the engine is equal to or greater than the oxygen amount threshold", the accuracy of the air-fuel ratio imbalance among cylinders determination can be improved.

In this case, the determining prohibiting means may be configured in such a manner that the determining prohibiting means determines that the engine operating state is "in the state in which the amount of the oxygen included in the exhaust gas discharged from the engine is equal to or greater than the oxygen amount threshold", "when the air-fuel ratio of the mixture supplied to the engine is set at (to) an air-fuel ratio leaner than the stoichiometric air-fuel ratio". For example, the air-fuel ratio of the mixture supplied to the engine is set at the air-fuel ratio leaner than the stoichiometric air-fuel ratio in order to avoid a generation of an emission odor due to sulfur and so on. It should be noted that "the case in which the air-fuel ratio of the mixture supplied to the engine is set at the air-fuel ratio leaner than the stoichiometric air-fuel ratio" may include a case in which the target upstream air-fuel ratio is set at (to) an air-fuel ratio leaner than the stoichiometric air-fuel ratio.

In another aspect of the air-fuel ratio imbalance among cylinders determining apparatus according to the present invention, the determining prohibiting condition is defined to be satisfied when the engine operating state is in a state in which "the amount of the hydrogen included in the exhaust gas discharged from the engine is equal to or greater than a hydrogen amount threshold".

When the engine operating state is in the state in which "the amount of the hydrogen included in the exhaust gas discharged from the engine is equal to or greater than the hydrogen amount threshold", the hydrogen is not sufficiently purified in the catalytic converter, and thus, the hydrogen flows out from the catalytic converter (to downstream of the catalytic converter). Alternatively, when the engine operating state is in the state in which "the amount of the hydrogen included in the exhaust gas discharged from the engine is equal to or greater than the hydrogen amount threshold", there is a possibility that the hydrogen is generated on a temporary bases in a specific cylinder even though the air-fuel ratio imbalance among cylinders is not actually occurring due to the characteristic of the injector.

Accordingly, in these cases, it is likely that the imbalance determining parameter obtained based on the output value of the downstream air-fuel ratio sensor becomes a value which does not represent the degree of the air-fuel ratio imbalance among cylinders (the non-uniformity of air-fuel ratios among cylinders). Therefore, if the air-fuel ratio imbalance determination among cylinders is carried out under these states, it is likely that the determination is erroneous. In view of the above, as the configuration described above, by defining the determining prohibiting condition as the condition to be satisfied "when the engine operating state is in the state in which the amount of the hydrogen included in the exhaust gas discharged from the engine is equal to or greater than the hydrogen amount threshold", the accuracy of the air-fuel ratio imbalance among cylinders determination can be improved.

In this case, the determining prohibiting means may be configured in such a manner that the determining prohibiting means determines that the engine operating state is "in the state in which the amount of the hydrogen included in the exhaust gas discharged from the engine is equal to or greater than the hydrogen amount threshold", "when the air-fuel ratio of the mixture supplied to the engine is set at (to) an air-fuel ratio richer than the stoichiometric air-fuel ratio". For example, the air-fuel ratio of the mixture supplied to the engine is set at the air-fuel ratio richer than the stoichiometric air-fuel ratio in order to avoid "an overheat of the catalytic converter" or in order to improve "a stability in engine rotation immediately after a start of the engine or during a low speed operating state", and so on. It should be noted that "the case in which the air-fuel ratio of the mixture supplied to the engine is set at the air-fuel ratio richer than the stoichiometric air-fuel ratio" may include a case in which the target upstream air-fuel ratio is set at an air-fuel ratio richer than the stoichiometric air-fuel ratio.

In addition, the determining prohibiting means may be configured in such a manner that the determining prohibiting means determines that the engine operating state is "in the state in which the amount of the hydrogen included in the exhaust gas discharged from the engine is equal to or greater than the hydrogen amount threshold", when at least one of conditions (cases) described below is satisfied.

(a) when an elapsed time after the engine start is equal to or shorter than an elapsed time after engine start threshold, (b) when an engine cooling water temperature is equal to or lower than an engine cooling water temperature threshold, (c) when an elapsed time after a timing at which an engine state is changed from a state in which the air-fuel ratio of the mixture supplied to the engine is set at an air-fuel ratio richer than the stoichiometric air-fuel ratio to a state in which the air-fuel ratio of the mixture supplied to the engine is set at the stoichiometric air-fuel ratio is equal to or shorter than a predetermined time, and, (d) when an integrated value of an amount of the intake air introduced into the engine after the timing at which an engine state is changed from the state in which the air-fuel ratio of the mixture supplied to the engine is set at an air-fuel ratio richer than the stoichiometric air-fuel ratio to the state in which the air-fuel ratio of the mixture supplied to the engine is set at the stoichiometric air-fuel ratio is equal to or larger than an integrated air amount threshold after fuel amount increase stop.

In the cases from (a) to (d) described above, the amount of hydrogen generated during a combustion of the mixture is not stable (or is excessive), because the combustion is unstable. Accordingly, if the air-fuel ratio imbalance determination among cylinders is carried out under these states, it is likely that the determination is erroneous, because the amount of hydrogen included in the exhaust gas of the engine is unstable. In view of the above, by defining the determining prohibiting condition as at least one condition from (a) to (d) described above, the accuracy of the air-fuel ratio imbalance among cylinders determination can be improved.

In still another aspect of the air-fuel ratio imbalance among cylinders determining apparatus according to the present invention, the determining prohibiting condition is defined to be satisfied "when the purifying ability to oxidize hydrogen of the catalytic converter is equal to or smaller than a first predetermined ability". It should be noted that the purifying ability of the catalytic converter may be said to be "a total maximum amount of hydrogen $N_2$" which the catalytic converter can purify when the hydrogen $H_2$ is continuously flowed into the catalytic converter.

When the purifying ability to oxidize hydrogen of the catalytic converter is equal to or smaller than the first predetermined ability, the hydrogen can not be purified sufficiently, and therefore, the hydrogen may flow out to the position downstream of the catalytic converter. Consequently, the output value of the downstream air-fuel ratio sensor may be affected by the preferential diffusion of hydrogen, or an air-fuel ratio at the position downstream of the catalytic converter may not coincide with "the true average of the air-fuel ratio of the mixture supplied to the entire engine". Accordingly, even when the air-fuel ratio imbalance among cylinders is occurring, it is likely that the output value of the air-fuel ratio sensor does not correspond to "the true average of the air-fuel ratio which is excessively corrected by the air-fuel ratio feedback control using the output value of the upstream air-fuel ratio sensor". Therefore, if the air-fuel ratio imbalance determination among cylinders is carried out under these states, it is likely that the determination is erroneous. In view of the above, as the configuration described above, by defining the determining prohibiting condition as the condition to be satisfied "when the purifying ability to oxidize hydrogen of the catalytic converter is equal to or smaller than the first predetermined ability", the accuracy of the air-fuel ratio imbalance among cylinders determination can be improved.

In this case, the determining prohibiting means may be configured in such a manner that the determining prohibiting means determines that "the purifying ability to oxidize hydrogen of the catalytic converter is equal to or smaller than the first predetermined ability", when at least one of conditions (cases) described below is satisfied.

(e) an oxygen storage amount of the catalytic converter is equal to or smaller than a first oxygen storage amount threshold, (f) an integrated value (after-engine-start-integrated-air-amount) of an amount of the intake air introduced into the engine after the engine start is equal to or smaller than an after-engine-start-integrated-air-amount threshold, (g) a time for which a state of a throttle valve of the engine is a fully-closed state is equal to or longer than an idling time threshold, (h) an elapsed time after a timing at which the state of the throttle valve of the engine is changed to a state other than the fully-closed state is equal to or shorter than an idling-off time threshold, (i) it is determined that the catalytic converter is not in an activity state, and (j) it is determined that the catalytic converter is in an abnormal state.

In the case (e) described above, it can be determined that the purifying ability to oxidize hydrogen of the catalytic converter is equal to or smaller than the first predetermined ability, because an amount of the oxygen stored in the catalytic converter is small.

In the case (f) described above, it can be determined that the purifying ability to oxidize hydrogen of the catalytic converter is equal to or smaller than the first predetermined ability, because the exhaust gas of an amount which is sufficient to activate the catalytic converter has not flowed into the catalytic converter.

In the case (g) described above, "the throttle valve fully-closed state" in which a temperature of the exhaust gas is low and an amount of the exhaust gas is small continues for a time longer than the idling time threshold, and thus, a temperature of the catalytic converter lowers. Accordingly, it can be determined that the purifying ability to oxidize hydrogen of the catalytic converter is equal to or smaller than the first predetermined ability.

In the case (h) described above, the elapsed time after the timing at which the state of the throttle valve of the engine is changed from the fully-closed state to the state other than the fully-closed state is short, and the temperature of the catalytic converter which lowered while the throttle valve was fully-closed therefore does not reach a sufficient temperature. Accordingly, it can be determined that the purifying ability to oxidize hydrogen of the catalytic converter is equal to or smaller than the first predetermined ability.

In the case (i) described above, the catalytic converter is in a inactive state. Accordingly, it can be determined that the purifying ability to oxidize hydrogen of the catalytic converter is equal to or smaller than the first predetermined ability. It should be noted that whether or not "the catalytic converter is not in an activity state" in (i) described above can be determined by using the conditions (e) to (h) described above, and/or another conditions (for example, by estimating the temperature of the catalytic converter based on an estimated exhaust gas temperature and an exhaust gas amount, and thereafter, determining whether or not the estimated temperature of the catalytic converter is equal to or lower than a predetermined activation temperature threshold).

In the case (j) described above, it can be determined without doubt that the purifying ability to oxidize hydrogen of the catalytic converter is equal to or smaller than the first predetermined ability.

In still another aspect of the air-fuel ratio imbalance among cylinders determining apparatus according to the present invention, the determining prohibiting condition is defined to be satisfied "when the purifying ability to oxidize hydrogen of the catalytic converter is equal to or larger than a second predetermined ability". The second predetermined ability is naturally larger than the first predetermined ability.

When the purifying ability to oxidize hydrogen of the catalytic converter is equal to or larger than the second predetermined ability, there is a possibility that the average of the air-fuel ratio of the exhaust gas flowing out from the catalytic converter does not correspond to "the true average of the air-fuel ratio which is excessively corrected by the air-fuel ratio feedback control using the output value of the upstream air-fuel ratio sensor". Accordingly, if the air-fuel ratio imbalance determination among cylinders is carried out under such state, it is likely that the determination is erroneous. In view of the above, as the configuration described above, by defining the determining prohibiting condition as the condition to be satisfied "when the purifying ability to oxidize hydrogen of the catalytic converter is equal to or larger than the second predetermined ability", the accuracy of the air-fuel ratio imbalance among cylinders determination can be improved.

In this case, the determining prohibiting means may be configured in such a manner that the determining prohibiting means determines that "the purifying ability to oxidize hydrogen of the catalytic converter is equal to or larger than the second predetermined ability", when at least one of conditions (cases) described below is satisfied.

(k) the oxygen storage amount of the catalytic converter is equal to or larger than a second oxygen storage amount threshold, (l) "an integrated value of the amount of the intake air introduced into the engine after a fuel-cut operating state is terminated is equal to or smaller than an after-fuel-cut-termination-integrated-air-amount threshold, (m) "an elapsed time" after the fuel-cut operating state is terminated is equal to or shorter than an after-fuel-cut-termination-elapsed-time threshold, and (n) the number of reversing which is "the number of times incremented every time the output value of the downstream air-fuel ratio sensor cuts across (passes over) a value corresponding to the stoichiometric air-fuel ratio" after the fuel-cut operating state is terminated is equal to or smaller than the number of reversing threshold.

In the case (k) described above, it can be determined that the purifying ability to oxidize hydrogen of the catalytic converter is equal to or larger than the second predetermined ability, because the amount of the oxygen stored in the catalytic converter is excessive.

In the cases (l), (m), and (n) described above, it can be determined that the purifying ability to oxidize hydrogen of the catalytic converter is equal to or larger than the second predetermined ability, because the amount of the oxygen which has been accumulated into the catalytic converter during the fuel-cut operating state (fuel-supply-stop-operating state) is still excessive.

In still another aspect of the air-fuel ratio imbalance among cylinders determining apparatus according to the present invention, the determining prohibiting condition is defined to be satisfied "when a flow rate of the exhaust gas discharged from the engine is equal to or larger than a flow rate of the exhaust gas threshold".

When the flow rate of the exhaust gas discharged from the engine is equal to or larger than the flow rate of the exhaust gas threshold, an amount of hydrogen flowing into the catalytic converter exceeds the ability to oxidize hydrogen of the catalytic converter, and therefore, the hydrogen may flow out to the position downstream of the catalytic converter. Accordingly, it is likely that the output value of the downstream air-fuel ratio sensor is affected by the preferential diffusion of hydrogen, or an air-fuel ratio at the position downstream of the catalytic converter may not coincide with "the true average of the air-fuel ratio of the mixture supplied to the entire engine". Consequently, even when the air-fuel ratio imbalance among cylinders is occurring, it is likely that the output value of the downstream air-fuel ratio sensor does not correspond to "the true air-fuel ratio which is excessively corrected by the air-fuel ratio feedback control". Therefore, if the air-fuel ratio imbalance determination among cylinders is carried out under these states, it is likely that the determination is erroneous. In view of the above, as the configuration described above, by defining the determining prohibiting condition as the condition to be satisfied "when the flow rate of the exhaust gas discharged from the engine is equal to or larger than the flow rate of the exhaust gas threshold", the accuracy of the air-fuel ratio imbalance among cylinders determination can be improved.

In this case, the determining prohibiting means may be configured in such a manner that the determining prohibiting means determines that "the flow rate of the exhaust gas discharged from the engine is equal to or larger than the flow rate of the exhaust gas threshold", when at least one of conditions (cases) described below is satisfied.

(o) a load of the engine is equal to or larger than a load threshold, and (p) an intake air amount of the engine per unit time is equal to or larger than an intake air amount threshold.

Meanwhile, in one of aspects of the air-fuel ratio imbalance among cylinders determining apparatus according to the present invention described above, it is preferable that, the catalytic converter be disposed in the exhaust passage of the engine and at a position downstream of the exhaust-gas-aggregated-portion of (from) the plurality of the cylinders, the upstream air-fuel ratio sensor be disposed in the exhaust passage of the engine and at a position downstream of the exhaust-gas-aggregated-portion and upstream of the catalytic converter, and the downstream air-fuel ratio sensor be disposed in the exhaust passage of the engine and at the position downstream of the catalytic converter.

According to the configuration described above, the air-fuel ratio imbalance determination among cylinders is carried out with a system performing a typical air-fuel feedback control. In other words, it is not necessary for the catalytic converter (catalytic element) to be disposed so as to cover the downstream air-fuel ratio sensor.

In this case, it is preferable that, the air-fuel ratio feedback control means comprise main feedback amount calculating means for calculating "a main feedback amount to perform a feedback control of the air-fuel ratio of the mixture supplied to the engine" in such a manner that "the air-fuel ratio represented by the output value of the upstream air-fuel ratio sensor" coincides with "the stoichiometric air-fuel ratio which is the target upstream air-fuel ratio", sub feedback amount calculating means for calculating "a sub feedback amount to perform a feedback control of the air-fuel ratio of the mixture supplied to the engine" in such a manner that "the air-fuel ratio represented by the output value of the downstream air-fuel ratio sensor" coincides with "the stoichiometric air-fuel ratio", and fuel amount control means for controlling an amount of the fuel to be included in the mixture supplied to the engine based on the main feedback amount and the sub feedback amount, and the imbalance determining parameter obtaining means be configured so as to calculate the imbalance determining parameter based on the sub feedback amount.

In "the main feedback control" which is the air-fuel ratio feedback control using the main feedback control amount, the target upstream-side air-fuel ratio is set at the stoichiometric air-fuel ratio. Accordingly, when the air-fuel ratio represented by the output value of the upstream air-fuel ratio sensor coincides with the true average of the air-fuel ratio of the mixture supplied to the entire engine, the true average of the air-fuel ratio of the mixture supplied to the entire engine coincides with stoichiometric air-fuel ratio.

However, as described above, when the air-fuel ratio imbalance among cylinders is occurring, the output value of the air-fuel ratio sensor is affected by "the preferential diffusion of hydrogen $H_2$". Accordingly, the air-fuel ratio represented by the output value of the upstream air-fuel ratio sensor becomes an air-fuel ratio richer than the true average of the air-fuel ratio of the mixture supplied to the entire engine. Consequently, the true average of the air-fuel ratio of the mixture supplied to the entire engine is adjusted to an air-fuel ratio leaner than the stoichiometric air-fuel ratio by the main feedback control described above.

In the mean time, the hydrogen is oxidized (purified) by the catalytic converter, and the downstream air-fuel sensor therefore outputs the output value corresponding to "the true average of the air-fuel ratio of the mixture supplied to the entire engine". Accordingly, when the air-fuel ratio imbalance among cylinders is occurring, the sub feedback amount changes (shifts) to "a value to correct the true average of the air-fuel ratio of the mixture supplied to the entire engine to a richer side". In other words, when the air-fuel ratio imbalance among cylinders is occurring, the sub feedback amount changes to a value to cause the air-fuel ratio to become richer in an amount depending upon the degree of the imbalance.

In view of the above, the imbalance determining parameter obtaining means calculate the imbalance determining parameter based on the sub feedback amount. As a result, the apparatus can determine with high accuracy whether or not the air-fuel ratio imbalance among cylinders is occurring.

It should be noted that, in this case, it is preferable that the imbalance determining parameter obtaining means calculate the imbalance determining parameter based on "the sub feedback amount" obtained when the feedback control is performed (the amount of the fuel to be included in the mixture supplied to the engine is controlled based on the main feedback amount and the sub feedback amount) and the determining prohibiting condition is not satisfied.

In this case, it is preferable that the imbalance determining parameter obtaining means be configured so as to obtain a value corresponding to a steady-state component (stationary error) included in the sub feedback amount as the imbalance determining parameter.

According to the configuration described above, it is possible to obtain, as "the imbalance determining parameter, a value representing "a deviation (an error) between the true air-fuel ratio of the mixture supplied to the entire engine and the stoichiometric air-fuel ratio" with high accuracy. As a result, the accuracy of the air-fuel ratio imbalance among cylinders determination can be further improved.

Meanwhile, it is preferable that the sub feedback amount calculating means include learning means for performing learning by updating "a learning value of the sub feedback amount" based on "the steady-state component" and correcting the feedback amount according to the updated learning value, the fuel amount control means be configured so as to control the amount of the fuel to be included in the mixture supplied to the engine based on the learning value of the sub feedback amount in addition to the main feedback amount and the sub feedback amount, the imbalance determining parameter obtaining means be configured so as to calculate the imbalance determining parameter based on "the learning value of the sub feedback amount".

According to the configuration described above, the imbalance determining parameter is obtained based on "the learning value of the sub feedback amount". The learning value of the sub feedback amount is a value representing a deviation of the true air-fuel ratio of the mixture supplied to the engine from the stoichiometric air-fuel ratio with high accuracy. Accordingly, by the configuration described above, the imbalance determining parameter becomes a value representing the deviation of the true air-fuel ratio of the mixture supplied to the engine from the stoichiometric air-fuel ratio with high accuracy. Consequently, the accuracy of the air-fuel ratio imbalance among cylinders determination can be further improved.

DESCRIPTION OF THE BEST EMBODIMENT TO CARRY OUT THE INVENTION

An embodiment of the air-fuel ratio imbalance among cylinders determining apparatus (hereinafter, simply referred to as "a determining apparatus") for a multi-cylinder internal combustion engine according to the present invention will next be described with reference to the drawings. The determining apparatus is a portion of an air-fuel ratio control apparatus for controlling the air-fuel ratio of the engine. The determining apparatus is also a portion of a fuel injection amount control apparatus for controlling a fuel injection amount.

(Structure)

Figure 1:
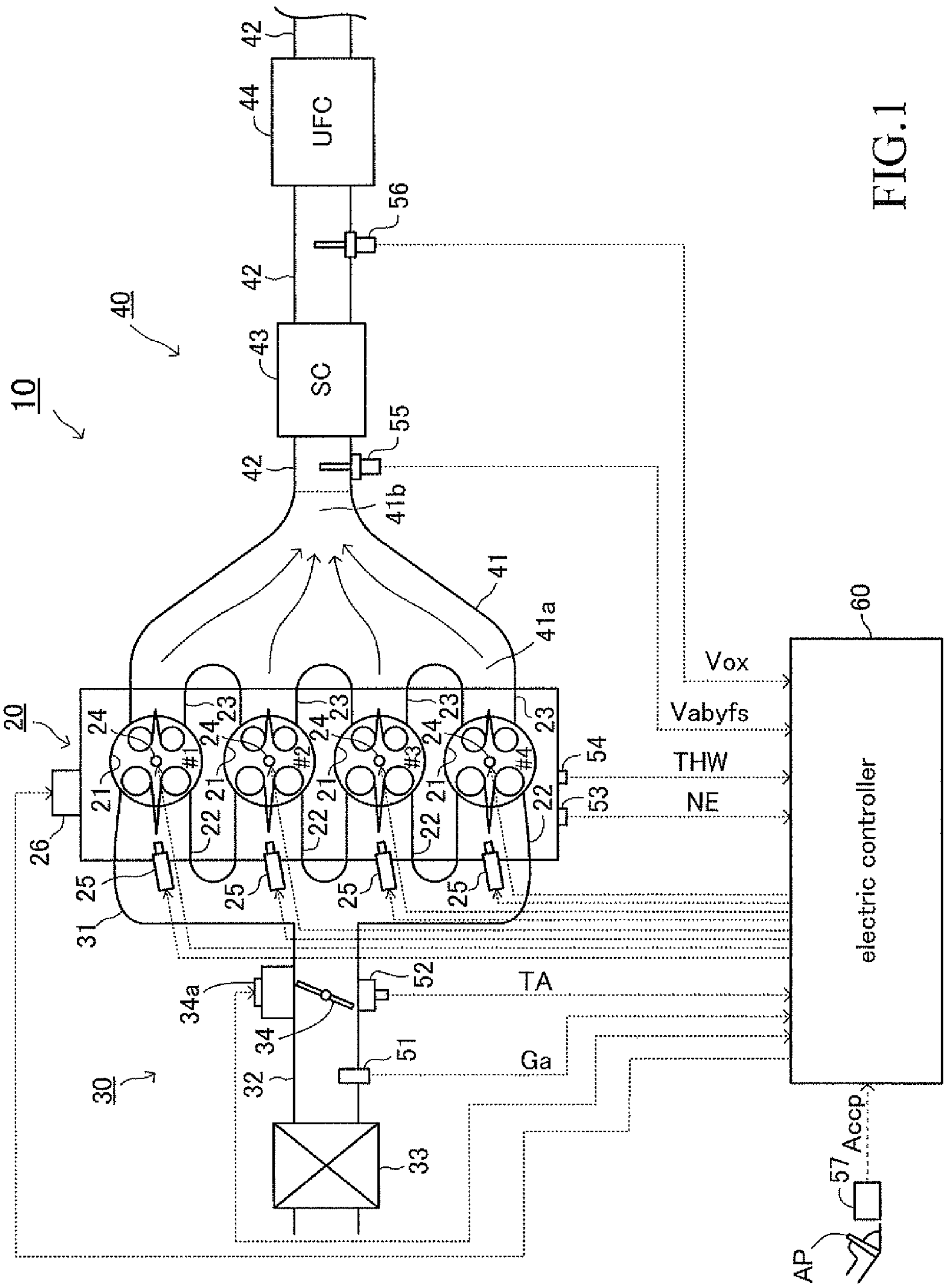
FIG. 1 is a schematic view of an internal combustion engine to which an air-fuel ratio imbalance among cylinders determining apparatus according to an embodiment of the present invention is applied.

FIG. 1 schematically shows a configuration of an internal combustion engine 10 to which the determining apparatus is applied. The engine 10 is a 4 cycle, spark-ignition, multi-cylinder (in the present example, 4 cylinder), gasoline engine. The engine 10 includes a main body section 20, an intake system 30, and an exhaust system 40.

The main body section 20 comprises a cylinder block section and a cylinder head section. The main body section 20 includes a plurality (four) of combustion chambers (a first cylinder #1 to a fourth cylinder #4) 21, each being composed of an upper surface of a piston, a wall surface of the cylinder, and a lower surface of the cylinder head section.

In the cylinder head section, intake ports 22 each of which is for supplying "a mixture comprising an air and a fuel" to each of combustion chambers (each of the cylinders) 21 are formed, and exhaust ports 23 each of which is for discharging an exhaust gas (burnt gas) from each of the combustion chambers 21. Each of the intake ports 22 is opened and closed by an intake valve which is not shown, and each of the exhaust ports 23 is opened and closed by an exhaust valve which is not shown.

A plurality (four) of spark plugs 24 are fixed in the cylinder head section. Each of the spark plugs 24 are provided in such a manner that its spark generation portion is exposed at a center portion of each of the combustion chambers 21 and at a position close to the lower surface of the cylinder head section. Each of the spark plugs 24 is configured so as to generate a spark for an ignition from the spark generation portion in response to an ignition signal.

A plurality (four) of fuel injection valves (injectors) 25 are fixed in the cylinder head section. Each of the fuel injectors 25 is provided for each of the intake ports 22 one by one. Each of the fuel injectors 25 is configured so as to inject, in response to an injection instruction signal, "a fuel of an instructed injection amount included in the injection instruction signal" into a corresponding intake port 22, when the fuel injector 25 is normal. In this way, each of the plurality of the cylinders 21 comprises the fuel injector 25 for supplying the fuel independently from the other cylinders.

An intake valve control apparatus 26 is provided in the cylinder head section. The intake valve control apparatus 26 comprises a well known configuration for hydraulically adjusting a relative angle (phase angle) between an intake cam shaft (now shown) and intake cams (not shown). The intake valve control apparatus 26 operates in response to an instruction signal (driving signal) so as to change opening-and-closing timings of the intake valve.

The intake system 30 comprises an intake manifold 31, an intake pipe 32, an air filter 33, a throttle valve 34, and an throttle valve actuator 34*a*.

The intake manifold 31 includes a plurality of branch portions each of which is connected to each of the intake ports 22, and a surge tank to which the branch portions aggregate. The intake pipe 32 is connected to the surge tank. The intake manifold 31, the intake pipe 32, and a plurality of the intake ports 22 constitute an intake passage. The air filter is provided at an end of the intake pipe. The throttle valve 34 is rotatably supported by the intake pipe 32 at a position between the air filter 33 and the intake manifold 31. The throttle valve 34 is configured so as to adjust an opening sectional area of the intake passage provided by the intake pipe 32 when it rotates. The throttle valve actuator 34*a* includes a DC motor, and rotates the throttle valve 34 in response to an instruction signal (driving signal).

The exhaust system 40 includes an exhaust manifold 41, an exhaust pipe 42, an upstream-side catalytic converter (catalyst) 43, and a downstream-side catalytic converter (catalyst) 44.

The exhaust manifold 41 comprises a plurality of branch portions 41*a*, each of which is connected to each of the exhaust ports 23, and a aggregated (merging) portion (exhaust gas aggregated portion) 41*b* into which the branch portions 41*a* aggregate (merge). The exhaust pipe 42 is connected to the aggregated portion 41*b* of the exhaust manifold 41. The exhaust manifold 41, the exhaust pipe 42, and a plurality of the exhaust ports 23 constitute a passage through which the exhaust gas passes. It should be noted that the aggregated portion 41*b* of the exhaust manifold 41 and the exhaust pipe 42 are referred to as "an exhaust passage" for convenience, in the present specification.

The upstream-side catalytic converter 43 is a three-way catalytic unit which supports "noble (precious) metals which are catalytic substances" and "a ceria ($CeO_2$)" on a support made of ceramics, and has an oxygen storage function and an oxygen release function (oxygen storage function). The upstream-side catalytic converter 43 is disposed (interposed) in the exhaust pipe 42. When a temperature of the upstream-side catalytic converter reaches a certain activation temperature, it exerts "a catalytic function for purifying unburnt substances (HC, CO, $H_2$, and so on) and nitrogen oxide (NOx) simultaneously" and "the oxygen storage function". It should be noted that the upstream-side catalytic converter 43 can be said to have "a function for purifying at least hydrogen $H_2$ by oxidizing the hydrogen $H_2$" in order to monitor (detect) the air-fuel ratio imbalance among cylinders. That is, the upstream-side catalytic converter 43 may be other types of catalyst (e.g., an oxidation catalyst), as long as it has "the function for purifying hydrogen $H_2$ by oxidizing the hydrogen $H_2$".

The downstream-side catalytic converter 44 is the three-way catalyst similar to the upstream-side catalytic converter 43. The downstream-side catalytic converter 44 is disposed (interposed) in the exhaust pipe 43 at a position downstream of the upstream-side catalytic converter 43.

The determining apparatus includes a hot-wire air flowmeter 51, a throttle position sensor 52, a engine rotational speed sensor 53, a water temperature sensor 54, an upstream (upstream-side) air-fuel ratio sensor 55, a downstream (downstream-side) air-fuel ratio sensor 56, and an accelerator opening sensor 57.

The hot-wire air flowmeter 51 measures a mass flow rate of an intake air flowing through the intake pipe 32 so as to output an signal Ga representing the mass flow rate (an intake air amount of the engine 10 per unit time).

The throttle position sensor 52 detects the opening of the throttle valve 34, and outputs a signal representing the throttle valve opening TA.

The engine rotational speed sensor 53 outputs a signal which includes a narrow pulse generated every time the intake cam shaft rotates 5 degrees and a wide pulse generated every time the intake cam shaft rotates 360 degrees. The signal output from the engine rotational speed sensor 53 is converted into a signal representing an engine rotational speed NE by an electric controller 60. Further, the electric controller 60 obtains, based on the signal from the engine rotational speed sensor 53 and a crank angle sensor which is not shown, a crank angle (an absolute crank angle) of the engine 10.

The water temperature sensor 54 detects a temperature of a cooling water (coolant) so as to output a signal representing the cooling water temperature THW.

The upstream air-fuel ratio sensor 55 is disposed at a position between the aggregated portion 41*b* of the exhaust manifold 41 and the upstream-side catalyst 43, and in either one of "the exhaust manifold 41 and the exhaust pipe 42 (that is, in the exhaust passage)". The upstream air-fuel ratio sensor 55 is "a wide range air-fuel ratio sensor of a limiting current type having a diffusion resistance layer" described in, for example, Japanese Patent Application Laid-Open (kokai) No. Hei 11-72473, Japanese Patent Application Laid-Open No. 2000-65782, and Japanese Patent Application Laid-Open No. 2004-69547, etc.

Figure 2:
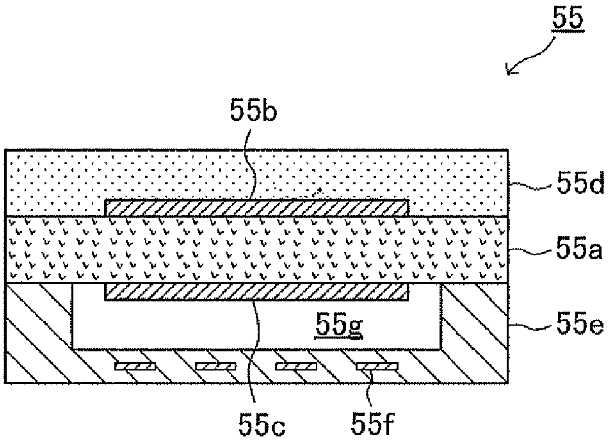
FIG. 2 is a schematic sectional view of an upstream air-fuel ratio sensor shown in FIG. 1.

As shown in FIG. 2, the upstream air-fuel ratio sensor 55 includes a solid electrolyte layer 55*a*, an exhaust-gas-side electrode layer 55*b*, an atmosphere-side electrode layer 55*c*, a diffusion resistance layer 55*d*, a wall section 55*e*, and a heater 55*f*.

The solid electrolyte layer 55*a* is an oxide sintered body having oxygen ion conductivity. In the present example, the solid electrolyte layer 55*a* is "a stabilized zirconia element" in which CaO as a stabilizing agent is solid-solved in $ZrO_2$ (zirconia). The solid electrolyte layer 55*a* exerts a well-known "an oxygen cell characteristic" and "an oxygen pumping characteristic", when a temperature of the solid electrolyte layer 55*a* is equal to or higher than an activation temperature. As described later, these characteristics are to be exerted when the upstream air-fuel ratio sensor 55 outputs an output value according to the air-fuel ratio of the exhaust gas. The oxygen cell characteristic is a characteristic of causing oxygen ion to move from a high oxygen concentration side to a low oxygen concentration side so as to generate an electro motive force. The oxygen pumping characteristic is a characteristic of causing oxygen ion to move from a negative electrode (lower potential side electrode) to a positive electrode (higher potential side electrode) in an amount according to an electric potential difference between these electrodes, when the electric potential difference is applied between both sides of the solid electrolyte layer 55*a*.

The exhaust-gas-side electrode layer 55*b* is made of a precious metal such as Platinum (Pt) which has a high catalytic activity. The exhaust-gas-side electrode layer 55*b* is formed on one of surfaces of the solid electrolyte layer 55*a*. The exhaust-gas-side electrode layer 55*b* is formed by chemical plating and the like in such a manner that it has an adequately high permeability (i.e., it is porous).

The atmosphere-side electrode layer 55*c* is made of a precious metal such as Platinum (Pt) which has a high catalytic activity. The atmosphere-side electrode layer 55*c* is formed on the other one of surfaces of the solid electrolyte layer 55*a* in such a manner that it faces (opposes) to the exhaust-gas-side electrode layer 55*b* to sandwich the solid electrolyte layer 55*a* therebetween. The atmosphere-side electrode layer 55*c* is formed by chemical plating and the like in such a manner that it has an adequately high permeability (i.e., it is porous).

The diffusion resistance layer (diffusion rate limiting layer) 55*d* is made of a porous ceramic (a heat resistant inorganic substance). The diffusion resistance layer 55*d* is formed so as to cover an outer surface of the exhaust-gas-side electrode layer 55*b* by, for example, plasma spraying and the like. A diffusion speed of hydrogen $H_2$ whose diameter is small in the diffusion resistance layer 55*d* is higher than a diffusion speed of "carbon hydride HC, carbon monoxide CO, or the like" whose diameter is relatively large in the diffusion resistance layer 55*d*. Accordingly, hydrogen $H_2$ reaches "exhaust-gas-side electrode layer 55*b*" more promptly than carbon hydride HC, carbon monoxide CO, owing to an existence of the diffusion resistance layer 55*d*. The upstream air-fuel ratio sensor 55 is disposed in such a manner that an outer surface of the diffusion resistance layer 55*d* is "exposed to the exhaust gas (the exhaust gas discharged from the engine 10 contacts with the outer surface of the diffusion resistance layer 55*d*).

The wall section 55*e* is made of a dense alumina ceramics through which gases can not pass. The wall section 55*e* is configured so as to form "an atmosphere chamber 55*g*" which is a space that accommodates the atmosphere-side electrode layer 55*c*. An air is introduced into the atmosphere chamber 55*g*.

The heater 55*f* is buried in the wall section 55*e*. When the heater is energized, it generates heat to heat up the solid electrolyte layer 55*a*.

Figure 3:
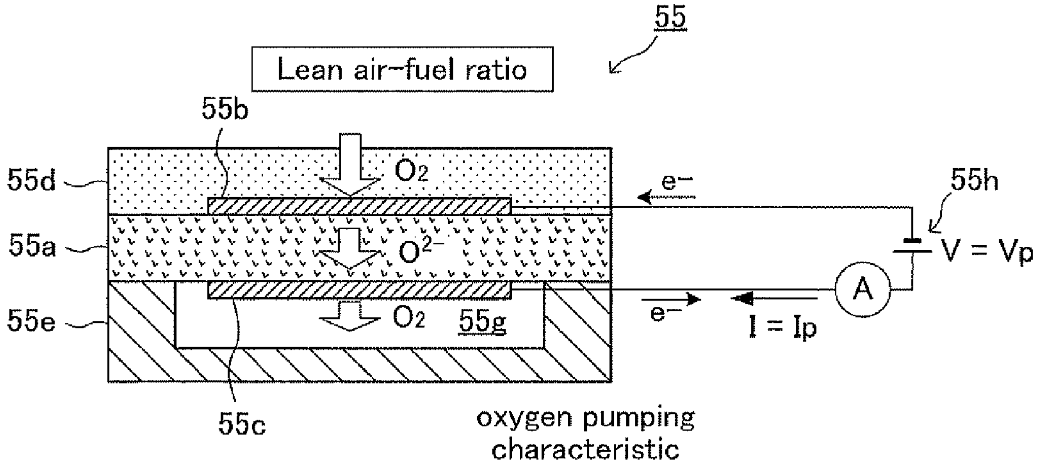
FIG. 3 is a figure for describing an operation of the upstream air-fuel ratio sensor, when an air-fuel ratio of an exhaust gas (gas to be detected) is in a lean side with respect to the stoichiometric air-fuel ratio.

As shown in FIG. 3, the upstream air-fuel ratio sensor 55 uses an electric power supply 55*h*. The electric power supply 55*h* applies an electric voltage V in such a manner that an electric potential of the atmosphere-side electrode layer 55*c* is higher than an electric potential of the exhaust-gas-side electrode layer 55*b*.

As shown in FIG. 3, when the air-fuel ratio of the exhaust gas is in the lean side with respect to the stoichiometric air-fuel ratio, the oxygen pumping characteristic is utilized so as to detect the air-fuel ratio. That is, when the air-fuel ratio of the exhaust gas is leaner than the stoichiometric air-fuel ratio, a large amount of oxygen molecules included in the exhaust gas reach the exhaust-gas-side electrode layer 55*b* after passing through the diffusion resistance layer 55*d*. The oxygen molecules receive electrons to change to oxygen ions. The oxygen ions pass through the solid electrolyte layer 55*a*, and release the electrons to change to oxygen molecules. As a result, a current I flows from the positive electrode of the electric power supply 55*h* to the negative electrode of the electric power supply 55*h*, thorough the atmosphere-side electrode layer 55*c*, the solid electrolyte layer 55*a*, and the exhaust-gas-side electrode layer 55*b*.

Figure 4:
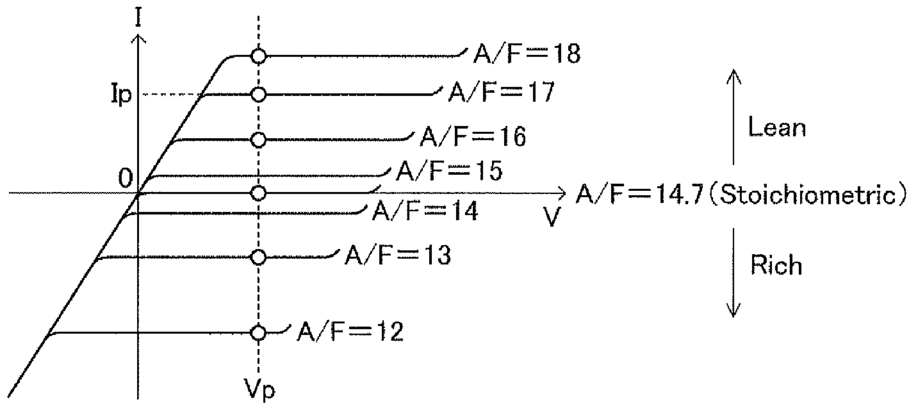
FIG. 4 is a graph showing a relationship between the air-fuel ratio of the exhaust gas and a limiting current value of the upstream air-fuel ratio sensor.

The magnitude of the electrical current I varies according to an amount of "the oxygen molecules reaching the exhaust-gas-side electrode layer 55*b* after passing through the diffusion resistance layer 55*d* by the diffusion" out of the oxygen molecules included in the exhaust gas reaching the outer surface of the diffusion resistance layer 55*d*. That is, the magnitude of the electrical current I varies depending upon a concentration (partial pressure) of oxygen at the exhaust-gas-side electrode layer 55*b*. The concentration of oxygen at the exhaust-gas-side electrode layer 55*b* varies depending upon the concentration of oxygen of the exhaust gas reaching the outer surface of the diffusion resistance layer 55*d*. The current I, as shown in FIG. 4, does not vary when the voltage V is set at a value equal to or higher than the predetermined value Vp, and therefore, is referred to as a limiting current Ip. The air-fuel ratio sensor 55 outputs the value corresponding to the air-fuel ratio based on the limiting current Ip.

Figure 5:
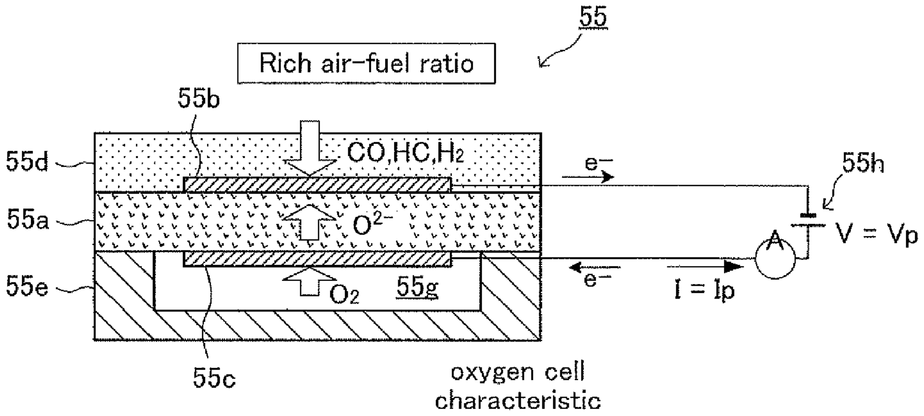
FIG. 5 is a figure for describing an operation of the upstream air-fuel ratio sensor, when the air-fuel ratio of the exhaust gas (gas to be detected) is in a rich side with respect to the stoichiometric air-fuel ratio.

On the other hand, as shown in FIG. 5, when the air-fuel ratio of the exhaust gas is in the rich side with respect to the stoichiometric air-fuel ratio, the oxygen cell characteristic is utilized so as to detect the air-fuel ratio. More specifically, when the air-fuel ratio of the exhaust gas is richer than the stoichiometric air-fuel ratio, a large amount of unburnt substances (HC, CO, and $H_2$ etc.) reach the exhaust-gas-side electrode layer 55*b* through the diffusion resistance layer 55*d*. In this case, a difference (oxygen partial pressure difference) between the concentration of oxygen at the atmosphere-side electrode layer 55*c* and the concentration of oxygen at the exhaust-gas-side electrode layer 55*b* becomes large, and thus, the solid electrolyte layer 55*a* functions as an oxygen cell. The applied voltage V is set at a value lower than the elective motive force of the oxygen cell.

Accordingly, oxygen molecules existing in the atmosphere chamber 55*g* receive electrons at the atmosphere-side electrode layer 55*c* so as to change into oxygen ions. The oxygen ions pass through the solid electrolyte layer 55*a*, and move to the exhaust-gas-side electrode layer 55*b*. Then, they oxidize the unburnt substances at the exhaust-gas-side electrode layer 55*b* to release electrons. Consequently, a current I flows from the negative electrode of the electric power supply 55*h* to the positive electrode of the electric power supply 55*h*, thorough the exhaust-gas-side electrode layer 55*b*, the solid electrolyte layer 55*a*, and the atmosphere-side electrode layer 55*c*.

The magnitude of the electrical current I varies according to an amount of "the oxygen ions reaching the exhaust-gas-side electrode layer 55*b* from the atmosphere-side electrode layer 55*c* through the solid electrolyte layer 55*a*. As described above, the oxygen ions are used to oxidize the unburnt substances at the exhaust-gas-side electrode layer 55*b*. Accordingly, the amount of the oxygen ions passing through the solid electrolyte layer 55*a* becomes larger, as an amount of the unburnt substances reaching the exhaust-gas-side electrode layer 55*b* through the diffusion resistance layer 55*d* by the diffusion becomes larger. In other words, as the air-fuel ratio is smaller (as the air-fuel ratio is richer, and thus, an amount of the unburnt substances becomes larger), the magnitude of the electrical current I becomes larger. Meanwhile, the amount of the unburnt substances reaching the exhaust-gas-side electrode layer 55*b* is limited owing to the existence of the diffusion resistance layer 55*d*, and therefore, the current I becomes a constant value Ip varying depending upon the air-fuel ratio. The upstream air-fuel ratio sensor 55 outputs the value corresponding to the air-fuel ratio based on the limiting current Ip.

Figure 6:
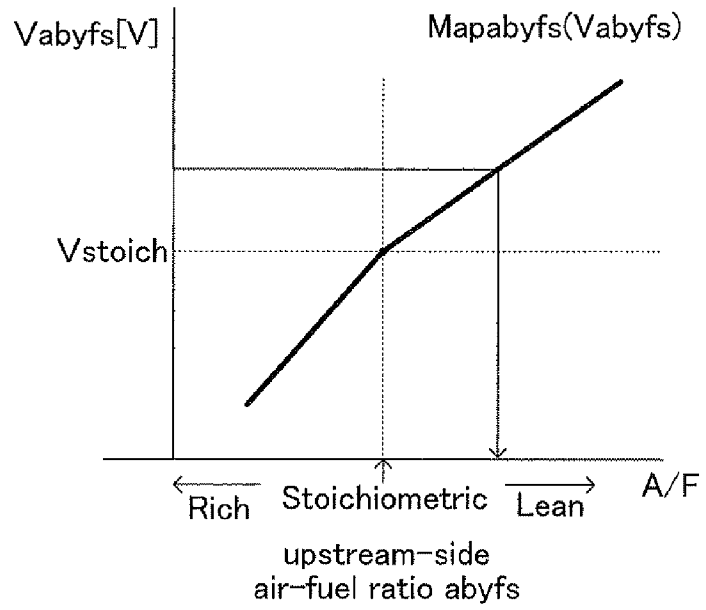
FIG. 6 is a graph showing a relationship between the air-fuel ratio of the exhaust gas and an output value of the upstream air-fuel ratio sensor.

As shown in FIG. 6, the upstream air-fuel ratio sensor 55 utilizing the above described detecting principle outputs the output values Vabyfs according to the air-fuel ratio (an upstream-side air-fuel ratio abyfs) of the exhaust gas flowing through the position at which the upstream air-fuel ratio sensor 55 is disposed. The output values Vabyfs is obtained by converting the limiting current Ip into a voltage. The output values Vabyfs increases, as the air-fuel ratio of the gas to be detected becomes larger (leaner). The electric controller 60, described later, stores an air-fuel ratio conversion table (map) Mapabyfs shown in FIG. 6, and detects an actual upstream-side air-fuel ratio abyfs by applying an actual output value Vabyfs to the air-fuel ratio conversion table Mapabyfs. The air-fuel ratio conversion table Mapabyfs is made in consideration of the preferential diffusion of hydrogen. In other words, the table Mapabyfs is made based on "an actual output value Vabyfs of the upstream air-fuel sensor 55" when the air-fuel ratio of the exhaust gas reaching the upstream air-fuel ratio sensor 55 is set at a value X by setting each of the air-fuel ratios of each of the cylinders at the same air-fuel ratio X to each other.

Referring back to FIG. 1 again, the downstream air-fuel ratio sensor 56 is disposed in the exhaust pipe 42 (i.e., the exhaust passage), and at a position between the upstream-side catalytic converter 43 and the downstream-side catalytic converter 44. The downstream air-fuel ratio sensor 56 is a well-known oxygen-concentration-cell-type oxygen concentration sensor (O2 sensor). The downstream air-fuel ratio sensor 56 has a structure similar to the upstream air-fuel ratio sensor 55 shown in FIG. 2 (except the electric power supply 55*h*). Alternatively, the downstream air-fuel ratio sensor 56 may comprise a test-tube like solid electrolyte layer, an exhaust-gas-side electrode layer formed on an outer surface of the solid electrolyte layer, an atmosphere-side electrode layer formed on an inner surface of the solid electrolyte layer in such a manner that it is exposed in an atmosphere chamber and faces (opposes) to the exhaust-gas-side electrode layer to sandwich the solid electrolyte layer therebetween, and a diffusion resistance layer which covers the exhaust-gas-side electrode layer and with which the exhaust gas contacts (or which is exposed in the exhaust gas). The downstream air-fuel ratio sensor 56 outputs an output value Voxs in accordance with an air-fuel ratio (downstream-side air-fuel ratio afdown) of the exhaust gas passing through the position at which the downstream air-fuel ratio sensor 56 is disposed.

Figure 7:
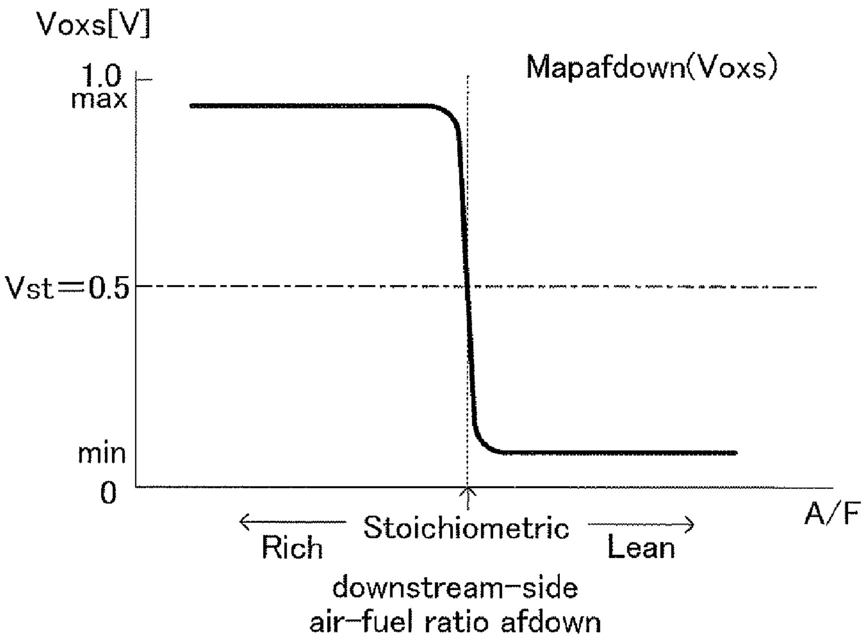
FIG. 7 is a graph showing a relationship between an air-fuel ratio of the exhaust gas and an output value of the downstream air-fuel ratio sensor.

As shown in FIG. 7, the output value Voxs of the downstream air-fuel ratio sensor 56 becomes equal to a maximum output value max (e.g., about 0.9 V) when the air-fuel ratio of the gas to be detected is richer than the stoichiometric air-fuel ratio, becomes equal to a minimum output value min (e.g., about 0.1 V) when the air-fuel ratio of the gas to be detected is leaner than the stoichiometric air-fuel ratio, and becomes equal to a voltage Vst which is about a middle value between the maximum output value max and the minimum output value min (the middle voltage Vst, e.g., about 0.5 V) when the air-fuel ratio of the gas to be detected is equal to the stoichiometric air-fuel ratio. Further, the output value Voxs varies rapidly from the maximum output value max to the minimum output value min when the air-fuel ratio of the gas to be detected varies from the air-fuel ratio richer than the stoichiometric air-fuel ratio to the air-fuel ratio leaner than the stoichiometric air-fuel ratio, and the output value Voxs varies rapidly from the minimum output value min to the maximum output value max when the air-fuel ratio of the gas to be detected varies from the air-fuel ratio leaner than the stoichiometric air-fuel ratio to the air-fuel ratio richer than the stoichiometric air-fuel ratio.

The accelerator opening sensor 57 shown in FIG. 1 detects an operation amount of the accelerator pedal AP operated by a driver so as to output a signal representing the operation amount Accp of the accelerator pedal AP.

The electric controller 60 is "a well-known microcomputer", comprising "a CPU, a ROM, a RAM, a backup RAM (or a nonvolatile memory such as an EEPROM) which stores data while it is supplied with the electric power, and holds (retains) the data while supplying the electric power is terminated, and an interface including an AD converter, and so on".

The interface of the electric controller 60 is connected to the sensors 51 to 57 and supplies signals from the sensors to the CPU. Further, the interface sends instruction signals (drive signals), in accordance with instructions from the CPU, to each of the spark plugs of each of the cylinders, each of the fuel injectors 25 of each of the cylinders, the intake valve control apparatus 26, the throttle valve actuator 34*a*, and so on. It should be noted that the electric controller 60 sends the instruction signal to the throttle valve actuator 34*a*, in such a manner that the throttle valve opening angle TA is increased as the obtained accelerator pedal operation amount Accp becomes larger.

(Principle of a Determination of an Air-Fuel Ratio Imbalance Among Cylinders)

Next will be described the principle of "the determination of an air-fuel ratio imbalance among cylinders". The determination of an air-fuel ratio imbalance among cylinders is determining whether or not the air-fuel ratio imbalance among cylinders becomes larger than a warning value, in other words, is determining whether or not a non-uniformity among individual cylinder air-fuel-ratios (which can not be permissible in view of the emission) (i.e., the air-fuel ratio imbalance among cylinders) is occurring.

The fuel of the engine 10 is a chemical compound of carbon and hydrogen. Accordingly, "carbon hydride HC, carbon monoxide CO, and hydrogen $H_2$, and so on" are generated as intermediate products, while the fuel is burning so as to change to water $H_2O$ and carbon dioxide $CO_2$.

Figure 8:
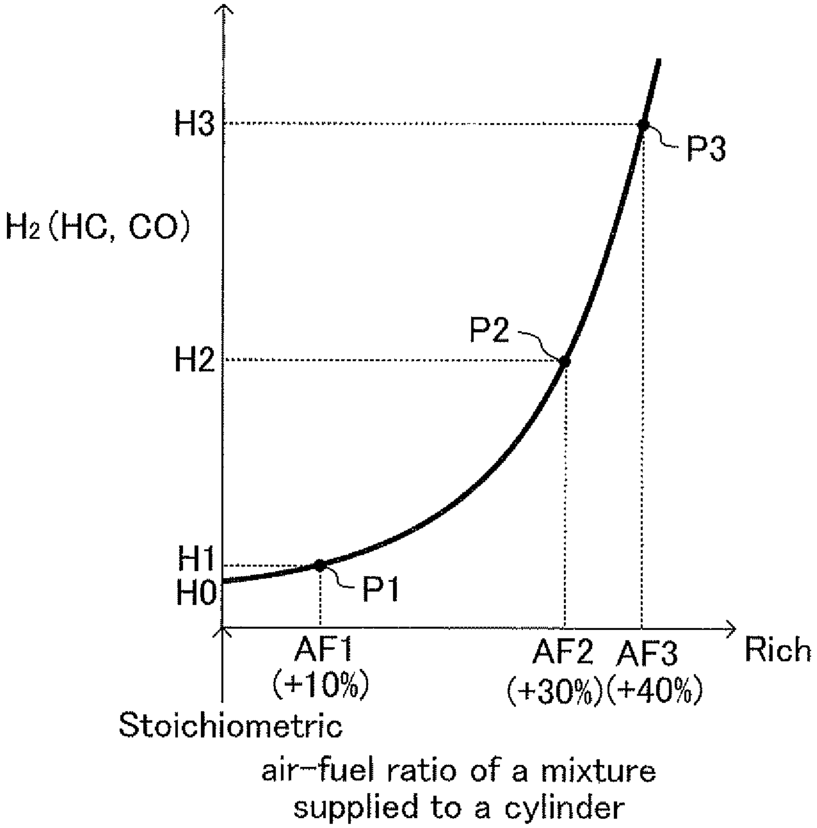
FIG. 8 is a graph showing a relationship between an air-fuel ratio of a mixture supplied to a cylinder and an amount of unburnt substances discharged from the cylinder.

As the air-fuel ratio of the mixture for the combustion becomes smaller than the stoichiometric air-fuel ratio (i.e., as the air-fuel ratio becomes richer than the stoichiometric air-fuel ratio), a difference between an amount of oxygen required for a perfect combustion and an actual amount of oxygen becomes larger. In other words, as the air-fuel ratio becomes richer, a shortage amount of oxygen during the combustion increases, and therefore, a concentration of oxygen lowers. Thus, a probability that intermediate products (unburnt substances) meet and bind with oxygen greatly decreases. Consequently, as shown in FIG. 8, an amount of the unburnt substances (HC, CO, and $H_2$) discharged from a cylinder drastically (e.g., in a quadratic function fashion) increases, as the air-fuel ratio of the mixture supplied to the cylinder becomes richer. It should be noted that points P1, P2, and P3 corresponds to states in which an amount of fuel supplied to a certain cylinder becomes 10% (=AF1) excess, 30% (=AF2) excess, and 40% (=AF3) excess, respectively, with respect to an amount of fuel that causes an air-fuel ratio of the cylinder to coincide with the stoichiometric air-fuel ratio.

In the mean time, hydrogen $H_2$ is a small molecule, compared with carbon hydride HC and carbon monoxide CO. Accordingly, hydrogen $H_2$ rapidly diffuses through the diffusion resistance layer 55*d* of the upstream air-fuel ratio sensor 55, compared to the other unburnt substances (HC, CO). Therefore, when a large amount of the unburnt substances including HC, CO, and $H_2$ are generated, a preferential diffusion of hydrogen $H_2$ considerably occurs in the diffusion resistance layer 55*d*. That is, hydrogen $H_2$ reaches the surface of an air-fuel detecting element (the exhaust-gas-side electrode layer 55*b* formed on the surface of the solid electrolyte layer 55*a*) in a larger mount compared with "the other unburnt substances (HC, CO)". As a result, a balance between a concentration of hydrogen $H_2$ and a concentration of the other unburnt substances (HC, CO) is lost. In other words, a fraction of hydrogen $H_2$ to all of the unburnt substances included in "the exhaust gas reaching the air-fuel ratio detecting element (the exhaust-gas-side electrode layer 55*b*)" becomes larger than a fraction of hydrogen $H_2$ to all of the unburnt substances included in "the exhaust gas discharged from the engine 10".

Meanwhile, the determining apparatus is the portion of the air-fuel ratio control apparatus. The air-fuel ratio control apparatus performs "a feedback control on an air-fuel ratio (main feedback control)" to cause "the upstream-side air-fuel ratio represented by the output value Vabyfs of the upstream air-fuel ratio sensor 55" to coincide with "a target upstream-side air-fuel ratio abyfr". Generally, the target upstream-side air-fuel ratio abyfr is set at (to) the stoichiometric air-fuel ratio.

Further, the air-fuel ratio control apparatus performs "a feedback control on an air-fuel ratio (sub feedback control of an air-fuel ratio)" to cause "the output value Voxs of the downstream air-fuel sensor 56 (or the downstream-side air-fuel ratio afdown represented by the output value Voxs of the downstream air-fuel ratio sensor)" to coincide with "a target downstream-side value Voxsref (or a target downstream-side air-fuel ratio represented by the downstream-side value Voxsref). Generally, the target downstream-side value Voxsref is set at a value (0.5V) corresponding to the stoichiometric air-fuel ratio.

Here, it is assumed that each of air-fuel ratios of each of cylinders deviates toward a rich side without exception, while the air-fuel ratio imbalance among cylinders is not occurring. Such a state occurs, for example, when "a measured or estimated value of the intake air amount of the engine" which is a basis when calculating a fuel injection amount becomes larger than "a true intake air amount".

In this case, for example, it is assumed that the air-fuel ratio of each of the cylinders is AF2 shown in FIG. 8. When the air-fuel ratio of a certain cylinder is AF2, a larger amount of the unburnt substances (thus, hydrogen $H_2$) are included in the exhaust gas than when the air-fuel ratio of the certain cylinder is AF1 closer to the stoichiometric air-fuel ratio than AF2 (refer the point P1 and the point P2). Accordingly, "the preferential diffusion of hydrogen $H_2$" occurs in the diffusion resistance layer 55*d* of the upstream air-fuel ratio sensor 55.

In this case, a true average of the air-fuel ratio of "the mixture supplied to the engine 10 during a period in which each and every cylinder completes one combustion stroke (a period corresponding to 720° crank angle)" is also AF2. In addition, as described above, the air-fuel ratio conversion table Mapabyfs shown in FIG. 6 is made in consideration of "the preferential diffusion of hydrogen $H_2$". Therefore, the upstream-side air-fuel ratio abyfs represented by the actual output value Vabyfs of the upstream air-fuel ratio sensor 55 (i.e., the upstream-side air-fuel ratio abyfs obtained by applying the actual output value Vabyfs to the air-fuel ratio conversion table Mapabyfs) coincides with "the true average AF2 of the air-fuel ratio".

Accordingly, by the main feedback control, the air-fuel ratio of the mixture supplied to the entire engine 10 is corrected in such a manner that it coincides with "the stoichiometric air-fuel ratio which is the target upstream-side air-fuel ratio abyfr", and therefore, each of the air-fuel ratios of each of the cylinders also roughly coincides with the stoichiometric air-fuel ratio, since the air-fuel ratio imbalance among cylinders is not occurring. Consequently, a sub feedback amount (as well as a learning value of the sub feedback amount described later) does not become a value which corrects the air-fuel ratio in a great amount. In other words, when the air-fuel ratio imbalance among cylinders is not occurring, the sub feedback amount (as well as the learning value of the sub feedback amount described later) does not become the value which corrects the air-fuel ratio in a great amount.

Another description will next be made regarding behaviors of various values, when "the air-fuel ratio imbalance among cylinders" is not occurring.

For example, it is assumed that an air-fuel ratio A0/F0 is equal to the stoichiometric air-fuel ratio (e.g., 14.5), when the intake air amount (weight) introduced into each of the cylinders of the engine 10 is A0, and the fuel amount (weight) supplied to each of the cylinders is F0.

Further, it is assumed that an amount of the fuel supplied (injected) to each of the cylinders becomes uniformly excessive in 10% due to an error in estimating the intake air amount, etc. That is, it is assumed that the fuel of 1.1·F0 is supplied to each of the cylinder. Here, a total amount of the intake air supplied to the engine 10 which is the four cylinder engine (i.e., an intake amount supplied to the entire engine 10 during the period in which each and every cylinder completes one combustion stroke) is equal to 4·A0. A total amount of the fuel supplied to the engine 10 (i.e., a fuel amount supplied to the entire engine 10 during the period in which each and every cylinder completes one combustion stroke) is equal to 4.4·F0 (=1.1·F0+1.1·F0+1.1·F0+1.1·F0). Accordingly, a true average of the air-fuel ratio of the mixture supplied to the entire engine 10 is equal to 4·A0/(4.4·F0)=A0/(1.1·F0). At this time, the output value of the upstream air-fuel ratio sensor becomes equal to an output value corresponding to the air-fuel ratio A0/(1.1·F0).

Accordingly, the amount of the fuel supplied to each of the cylinders is decreased in 10% (the fuel of 1·F0 is supplied to each of the cylinders) by the main feedback control, and therefore, the air-fuel ratio of the mixture supplied to the entire engine 10 is caused to coincide with the stoichiometric air-fuel ratio A0/F0.

In contrast, it is assumed that only the air-fuel ratio of a specific cylinder greatly deviates to (become) the richer side. This state occurs, for example, when the fuel injection characteristic of the fuel injector 25 provided for the specific cylinder becomes "the characteristic that the injector 25 injects the fuel in an amount which is considerable larger (more excessive) than the instructed fuel injection amount". This type of abnormality of the injector 25 is also referred to as "rich deviation abnormality of the injector".

Here, it is assumed that an amount of fuel supplied to one certain specific cylinder is excessive in 40% (i.e., 1.4·F0), and an amount of fuel supplied to each of the other three cylinders is a fuel amount required cause the air-fuel ratio of the other three cylinders to coincide with the stoichiometric air-fuel ratio (i.e., F0). Under this assumption, the air-fuel ratio of the specific cylinder is "AF3" shown in FIG. 8, and the air-fuel ratio of each of the other cylinders is the stoichiometric air-fuel ratio.

At this time, a total amount of the intake air supplied to the engine 10 which is the four cylinder engine (an amount of air supplied to the entire engine 10 during the period in which each and every cylinder completes one combustion stroke) is equal to 4·A0. A total amount of the fuel supplied to the entire engine 10 (an amount of fuel supplied to the entire engine 10 during the period in which each and every cylinder completes one combustion stroke) is equal to 4.4·F0 (=1.4·F0+F0+F0+F0).

Accordingly, the true average of the air-fuel ratio of the mixture supplied to the entire engine 10 is equal to 4·A0/(4.4·F0)=A0/(1.1·F0). That is, the true average of the air-fuel ratio of the mixture supplied to the entire engine 10 is the same as the value obtained "when the amount of fuel supplied to each of the cylinders is uniformly excessive in 10%" as described above.

However, as described above, the amount of the unburnt substances (HG, CO, and $H_2$) drastically increases, as the air-fuel ratio of the mixture supplied to the cylinder becomes richer and richer. Accordingly, "a total amount SH1 of hydrogen $H_2$ included in the exhaust gas in the case in which "only the amount of fuel supplied to the specific cylinder becomes excessive in 40%" is equal to SH1=H3+H0+H0+H0=H3+3·H0, according to FIG. 8. In contrast, "a total amount SH2 of hydrogen $H_2$ included in the exhaust gas in the case in which "the amount of the fuel supplied to each of the cylinders is uniformly excessive in 10%" is equal to SH2=H1+H1+H1+H1=4·H1, according to FIG. 8. The amount H1 is slightly larger than the amount H0, however, both of the amount H1 and the amount H0 are considerably small. That is, the amount H1 and the amount H0, as compared to the amount H3, is substantially equal to each other. Consequently, the total hydrogen amount SH1 is considerably larger than the total hydrogen amount SH2 (SH1>>SH2).

As described above, even when the average of the air-fuel ratio of the mixture supplied to the entire engine 10 is the same, the total amount SH1 of hydrogen included in the exhaust gas when the air-fuel ratio imbalance among cylinders is occurring is considerably larger than the total amount SH2 of hydrogen included in the exhaust gas when the air-fuel ratio imbalance among cylinders is not occurring.

Accordingly, the air-fuel ratio represented by the output value Vabyfs of the upstream air-fuel ratio sensor when only the amount of fuel supplied to the specific cylinder is excessive in 40% becomes richer (smaller) than "the true average of the air-fuel ratio (A0/(1.1·F0)) of the mixture supplied to the engine 10", due to "the preferential diffusion of hydrogen $H_2$" in the diffusion resistance layer 55*d*. That is, even when the average of the air-fuel ratio of the exhaust gas is the same air-fuel ratio, the concentration of hydrogen $H_2$ at the exhaust-gas-side electrode layer 55*b* of the upstream air-fuel ratio sensor 55 becomes higher when the air-fuel ratio imbalance among cylinders is occurring than when the air-fuel ratio imbalance among cylinders is not occurring. Accordingly, the output value Vabyfs of the upstream air-fuel ratio sensor 55 becomes a value indicating an air-fuel ratio richer than "the true average of the air-fuel ratio".

Consequently, by the main feedback control, the true average of the air-fuel ratio of the mixture supplied to the entire engine 10 is caused to be leaner than the stoichiometric air-fuel ratio.

On the other hand, the exhaust gas which has passed through the upstream-side catalytic converter 43 reaches the downstream air-fuel ratio sensor 56. The hydrogen $H_2$ included in the exhaust gas is oxidized (purified) together with the other unburnt substances (HC, CO) in the upstream-side catalytic converter 43. Accordingly, the output value Voxs of the downstream air-fuel ratio sensor 56 becomes a value corresponding to the average of the true air-fuel ratio of the mixture supplied to the engine 10. The air-fuel ratio correction amount (the sub feedback amount) calculated according to the sub feedback control becomes a value which compensates for the excessive correction of the air-fuel ratio to the lean side. The sub feedback amount causes the true average of the air-fuel amount of the engine 10 to coincide with the stoichiometric air-fuel ratio.

As described above, the air-fuel ratio correction amount (the sub feedback amount) calculated according to the sub feedback control becomes the value to compensate for "the excessive correction of the air-fuel ratio to the lean side" caused by the rich deviation abnormality of the injector 25 (the air-fuel ratio imbalance among cylinders). In addition, a degree of the excessive correction of the air-fuel ratio to the lean side increases, as the injector 25 which is in the rich deviation abnormality state injects the fuel in larger amount with respect to "the instructed injection amount" (i.e., the air-fuel ratio of the specific cylinder becomes richer).

Therefore, in "a system in which the air-fuel ratio of the engine is corrected to the richer side", as the sub feedback amount is a positive value and the magnitude of the sub feedback amount becomes larger, "a value varying depending upon the sub feedback amount (in practice, for example, a learning value of the sub feedback amount, the learning value obtained from the steady-state component of the sub feedback amount)" is a value representing the degree of the air-fuel ratio imbalance among cylinders.

In view of the above, the present determining apparatus obtains the value varying depending upon the sub feedback amount (in the present example, "the sub FB learning value" which is the learning value of the sub feedback amount"), as the imbalance determining parameter. That is, the imbalance determining parameter is "a value which becomes larger, as a difference becomes larger between an amount of hydrogen included in the exhaust gas before passing through the upstream-side catalytic converter 43 and an amount of hydrogen included in the exhaust gas after passing through the upstream-side catalytic converter 43". Thereafter, the determining apparatus determines that the air-fuel ratio imbalance among cylinders is occurring, when the imbalance determining parameter becomes equal to or larger than "an abnormality determining threshold" (e.g., when the value which increases and decreases according to increase and decrease of the sub FB learning value becomes a value which corrects the air-fuel ratio of the engine to the richer side in an amount equal to or larger than the abnormality determining threshold")

Figure 9:
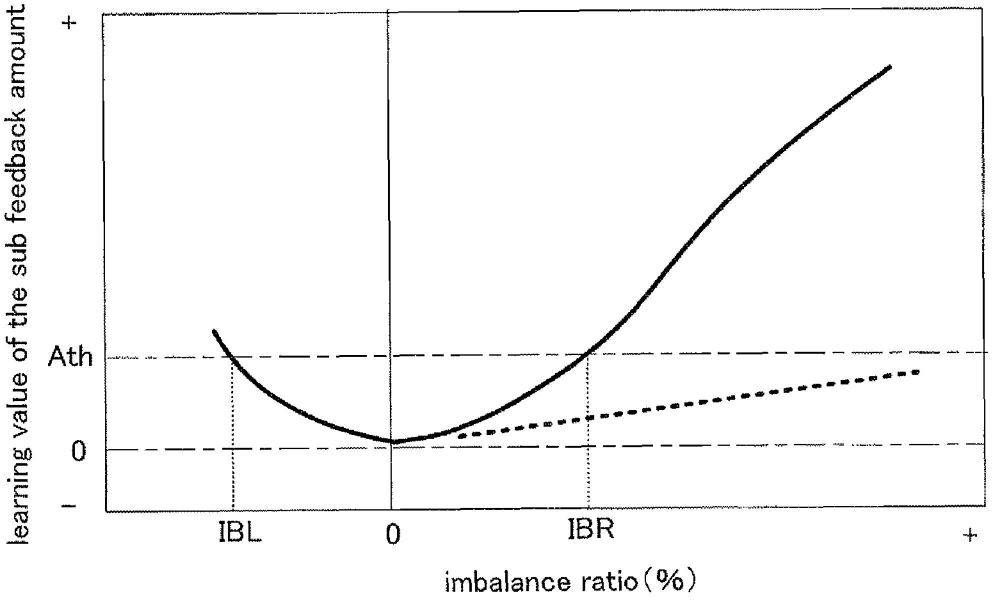
FIG. 9 is a graph showing a relationship between an air-fuel ratio imbalance ratio among cylinders and a sub feedback amount.

A solid line in FIG. 9 shows the sub F13 learning value, when an air-fuel ratio of a certain cylinder deviates to the richer side and to the leaner side from the stoichiometric air-fuel ratio, due to the air-fuel ratio imbalance among cylinders. An abscissa axis of the graph shown in FIG. 9 is "an imbalance ratio". The imbalance ratio is defined as a ratio (Y/X) of a difference Y (=X−af) between "the stoichiometric air-fuel ratio X and the air-fuel ratio af of the cylinder deviating to the richer side" to "the stoichiometric air-fuel ratio X". As described above, an affect due to the preferential diffusion of hydrogen $H_2$ drastically becomes greater, as the imbalance ratio becomes larger. Accordingly, as shown by the solid line in FIG. 9, the sub FB learning value (and therefore, the imbalance determining parameter) increases in a quadratic function fashion, as the imbalance ratio increases.

It should be noted that, as shown by the solid line in FIG. 9, the sub FB learning value increases as the imbalance ratio increases, when the imbalance ratio is a negative value. That is, for example, in a case in which the air-fuel ratio imbalance among cylinders occurs when an air-fuel ratio of one specific cylinder deviates to the leaner side, the sub FB learning value as the imbalance determining parameter (the value according to the sub feedback learning value) increases. This state occurs, for example, when the fuel injection characteristic of the fuel injector 25 provided for the specific cylinder becomes "the characteristic that the injector 25 injects the fuel in an amount which is considerable smaller than the instructed fuel injection amount". This type of abnormality of the injector 25 is also referred to as "lean deviation abnormality of the injector".

The reason why the sub FB learning value increases when the air-fuel ratio imbalance among cylinders occurs in which the air-fuel ratio of the single specific cylinder greatly deviates to the leaner side will next be described briefly. In the description below, it is assumed that the intake air amount (weight) introduced into each of the cylinders of the engine 10 is A0. Further, it is assumed that the air-fuel ratio A0/F0 coincides with the stoichiometric air-fuel ratio, when the fuel amount (weight) supplied to each of the cylinders is F0.

In addition, it is assumed that the amount of fuel supplied to one certain specific cylinder (the first cylinder, for convenience) is considerably small in 40% (i.e., 0.6·F0), and an amount of fuel supplied to each of the other three cylinders (the second, the third, and the fourth cylinder) is a fuel amount required cause the air-fuel ratio of the other three cylinders to coincide with the stoichiometric air-fuel ratio (i.e., F0). It should be noted it is assumed that a misfiring does not occur.

In this case, by the main feedback control, it is further assumed that the amount of the fuel supplied to each of the first to fourth cylinder is increased in the same amount (10%) to each other. At this time, the amount of the fuel supplied to the first cylinder is equal to 0.7·F0, and the amount of the fuel supplied to each of the second to fourth cylinder is equal to 1.1·F0.

Under this assumption, a total amount of the intake air supplied to the engine 10 which is the four cylinder engine (an amount of air supplied to the entire engine 10 during the period in which each and every cylinder completes one combustion stroke) is equal to 4·A0. A total amount of the fuel supplied to the engine 10 (an amount of fuel supplied to the entire engine 10 during the period in which each and every cylinder completes one combustion stroke) is equal to 4.0·F0 (=0.7·F0+1.1·F0+1.1·F0+1.1·F0), as a result of the main feedback control. Consequently, the true average of the air-fuel ratio of the mixture supplied to the entire engine 10 is equal to 4·A0/(4·F0)=A0/F0, that is the stoichiometric air-fuel ratio.

However, "a total amount SH3 of hydrogen $H_2$ included in the exhaust gas" in this case is equal to SH3=H4+H1+H1+H1=H4+3·H1. It should be noted that H4 is an amount of hydrogen generated when the air-fuel ratio is equal to A0/(0.7·F0) is smaller than H1 and H2, and is roughly equal to H0. Accordingly, the total amount SH3 is at most equal to (H0+3·H1).

In contrast, "a total amount SH4 of hydrogen $H_2$ included in the exhaust gas" when the air-fuel ratio imbalance among cylinders is not occurring and the true average of the air-fuel ratio of the mixture supplied to the entire engine 10 is equal to the stoichiometric air-fuel ratio is SH4=H0+H0+H0+H0=4·H0. As described above, H1 is slightly larger than H0. Accordingly, the total amount SH3(=H0+3·H1) is larger than the total amount SH4 (=4·H0).

Consequently, when the air-fuel ratio imbalance among cylinders is occurring due to "the lean deviation abnormality of the injector", the output value Vabyfs of the upstream air-fuel ratio sensor 55 is affected by the preferential diffusion of hydrogen, even when the true average of the air-fuel ratio of the mixture supplied to the entire engine 10 is shifted to the stoichiometric air-fuel ratio by the main feedback control. That is, the upstream-side air-fuel ratio abyfs obtained by applying the output value Vabyfs to the air-fuel ratio conversion table Mapabyfs becomes "richer (smaller)" than the stoichiometric air-fuel ratio which is the target upstream-side air-fuel ratio abyfr. As a result, the main feedback control is further performed, and the true average of the air-fuel ratio of the mixture supplied to the entire engine 10 is adjusted (corrected) to the leaner side with respect to the stoichiometric air-fuel ratio.

Accordingly, the air-fuel ratio correction amount calculated according to the sub feedback control becomes larger to compensate for "the excessive correction of the air-fuel ratio to the lean side according to the main feedback control" due to the lean deviation abnormality of the injector 25 (the air-fuel ratio imbalance among cylinders). Therefore, "the imbalance determining parameter (for example, the sub FB learning value)" obtained based on "the air-fuel ratio correction amount calculated according to the sub feedback control" increases as the imbalance ratio is a negative value and the magnitude of the imbalance ratio increases.

Accordingly, the present determining apparatus determines that the air-fuel ratio imbalance among cylinders is occurring, when the imbalance determining parameter (for example, the value which increases and decreases according to increase and decrease of the sub FB learning value) becomes equal to or larger than "the abnormality determining threshold Ath", not only in the case in which the air-fuel ratio of the specific cylinder deviates to "the rich side" but also in the case in which the air-fuel ratio of the specific cylinder deviates to "the lean side".

It should be noted that a dotted line in FIG. 9 indicates the sub FB learning value, when the each of the air-fuel ratios of each of the cylinders deviates uniformly to the richer side from the stoichiometric air-fuel ratio, and the main feedback control is terminated. In this case, the abscissa axis is adjusted so as to become the same deviation as "the deviation of the air-fuel ratio of the engine when the air-fuel ratio imbalance among cylinders is occurring". That is, for example, when "the air-fuel ratio imbalance among cylinders" is occurring in which only the air-fuel ratio of the first cylinder deviates by 20%, the imbalance ratio is 20%. In contrast, the actual imbalance ratio is 0%, when each of the air-fuel ratios of each of the cylinders uniformly deviates by 5% (20%/four cylinders), however, the imbalance ratio in this case is treated as 20% in FIG. 9. From a comparison the solid line in FIG. 9 and the dotted line in FIG. 9, it can be understood that "it is possible to determine that "the air-fuel ratio imbalance is occurring, when the sub FB learning value becomes equal to or larger than the abnormality determining threshold Ath". It should be noted that the sub FB learning value does not increase as shown by the dotted line in FIG. 9 in practice, since the main feedback control is performed when the air-fuel ratio imbalance among cylinders is not occurring.

(Actual Operation)

The actual operation of the present determining apparatus will next be described.

<Fuel Injection Amount Control>

Figure 10:
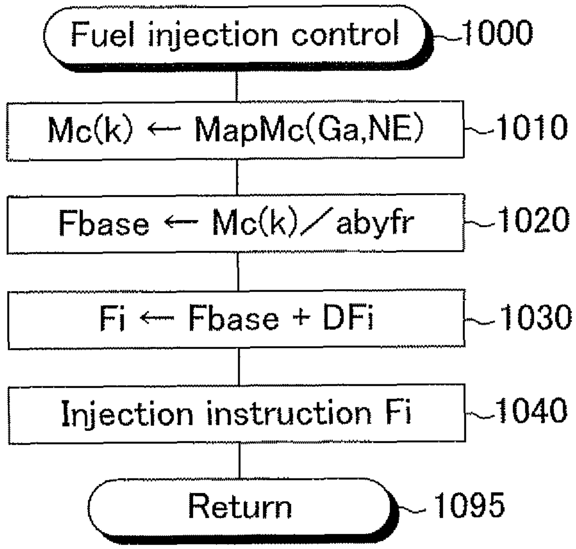
FIG. 10 is a flowchart showing a routine executed by a CPU of an electric controller shown in FIG. 1.

The CPU repeatedly executes a routine to calculate an fuel injection amount Fi and instruct an fuel injection, shown by a flowchart in FIG. 10, every time the crank angle of each of the cylinders reaches a predetermined crank angle before its intake top dead center (e.g., BTDC 90° CA), for the cylinder whose crank angle has reached the predetermined crank angle (hereinafter, referred to as "an fuel injection cylinder"). Accordingly, at an appropriate timing, the CPU starts a process from step 1100, and performs processes from step 1010 to step 1040 in this order, and thereafter, proceeds to step 1095 to end the present routine tentatively.

Step 1010: The CPU obtains "a cylinder intake air amount Mc(k)" which is "an air amount introduced into the fuel injection cylinder", on the basis of "the intake air flow rate Ga measured by the air flowmeter 51, the engine rotational speed NE, and a look-up table MapMc". The cylinder intake air amount Mc(k) is stored in the RAM, while being related to the intake stroke of each cylinder. The cylinder intake air amount Mc(k) may be calculated based on a well-known air model (a model constructed according to laws of physics describing and simulating a behavior of an air in the intake passage).

Step 1020: The CPU obtains a base fuel injection amount Fbase by dividing the cylinder intake air amount Mc(k) by the target upstream-side air-fuel ratio abyfr. The target upstream-side air-fuel ratio abyfr is set at (to) the stoichiometric air-fuel ratio, with the exception of special cases described later.

Step 1030: The CPU calculates a final fuel injection amount Fi by correcting the base fuel injection amount Fbase with a main feedback amount DFi (more specifically, by adding the main feedback amount DFi to the base fuel injection amount Fbase). The main feedback amount DFi will be described later.

Step 1030: The CPU sends an instruction signal to "the injector 25 disposed so as to correspond to the fuel injection cylinder" in order to have the injector 25 inject a fuel of the instructed fuel injection amount Fi.

In this way, the amount of fuel injected from each of the injectors 25 is uniformly increased and decreased with the main feedback amount DFi commonly used for all of the cylinders.

<Calculation of the Main Feedback Amount>

Figure 11:
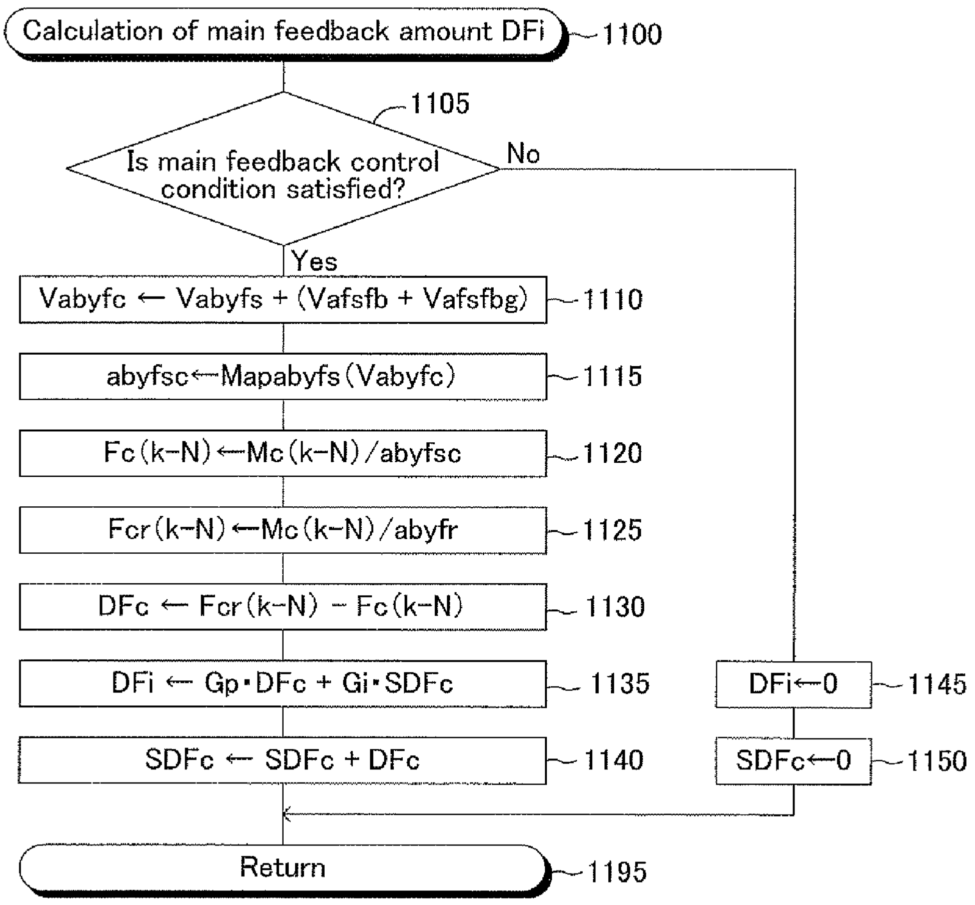
FIG. 11 is a flowchart showing a routine executed by the CPU of the electric controller shown in FIG. 1 for calculating a main feedback amount.

The CPU repeatedly executes a routine for the calculation of the main feedback amount shown by a flowchart in FIG. 11, every time a predetermined time period elapses. Accordingly, at a predetermined timing, the CPU starts the process from step 1100 to proceed to step 1105 at which CPU determines whether or not a main feedback control condition (an upstream-side air-fuel ratio feedback control condition) is satisfied.

The main feedback control condition is satisfied when all of the following conditions are satisfied.

(A1) The upstream air-fuel ratio sensor 55 has been activated.

(A2) The load (load rate) KL of the engine is smaller than or equal to a threshold value KLth.

(A3) An operating state of the engine 10 is not in a fuel-cut state.

It should be noted that the load rate KL is obtained based on the following formula (1). The accelerator pedal operation amount Accp, the throttle valve opening angle TA, and the like can be used instead of the load rate KL. In the formula (1), Mc is the cylinder intake air amount, ρ is an air density (unit is (g/l), L is a displacement of the engine 10 (unit is (l)), and "4" is the number of cylinders of the engine 10.

$$KL=(Mc/(\rho \cdot L/4))\cdot 100\% \quad (1)$$

The description continues assuming that the main feedback control condition is satisfied. In this case, the CPU makes a "Yes" determination at step 1105 to execute processes from steps 1110 to 1140 described below in this order, and then proceed to step 1195 to end the present routine tentatively.

Step 1110: The CPU obtains an output value Vabyfsc for a feedback control, according to a formula (2) described below. In the formula (2), Vabyfs is the output value of the upstream air-fuel ratio sensor 55, Vafsfb is the sub feedback amount calculated based on the output value Voxs of the downstream air-fuel ratio sensor 56, Vafsfbg is the learning value (sub FB learning value) of the sub feedback amount. These values are currently obtained values. The way by which the sub feedback amount Vafsfb is calculated and the way by which the sub FB learning value Vafsfbg are calculated will be described later.

$$Vabyfc=Vabyfs+(Vafsfb+Vafsfbg) \quad (2)$$

Step 1115: The CPU obtains an air-fuel ratio abyfsc for a feedback control by applying the output value Vabyfsc for a feedback control to the table Mapabyfs shown in FIG. 6, as shown by a formula (3) described below.

$$abyfsc=Mapabyfs(Vabyfsc) \quad (3)$$

Step 1120: According to a formula (4) described below, the CPU obtains "a cylinder fuel supply amount Fc(k−N)" which is "an amount of the fuel actually supplied to the combustion chamber 21 for a cycle at a timing N cycles before the present time". That is, the CPU obtains the cylinder fuel supply amount Fc(k−N) through dividing "the cylinder intake air amount Mc(k−N) which is the cylinder intake air amount for the cycle the N cycles (i.e., N·720° crank angle) before the present time" by "the air-fuel ratio abyfsc for a feedback control".

$$Fc(k-N)=Mc(k-N)/abyfsc \quad (4)$$

The reason why the cylinder intake air amount Mc(k−N) for the cycle N cycles before the present time is divided by the air-fuel ratio abyfsc for a feedback control in order to obtain the cylinder fuel supply amount Fc(k−N) is because "the exhaust gas generated by the combustion of the mixture in the combustion chamber 21" requires time "corresponding to the N cycles" to reach the upstream air-fuel ratio sensor 55. It should be noted that, in practical, a gas formed by mixing the exhaust gases from the cylinders in some degree reaches the upstream air-fuel ratio sensor 55.

Step 1125: The CPU obtains "a target cylinder fuel supply amount Fcr(k−N)" which is "a fuel amount which was supposed to be supplied to the combustion chamber 21 for the cycle the N cycles before the present time", according to a formula (5) described below. That is, the CPU obtains the target cylinder fuel supply amount Fcr(k−N) by dividing the cylinder intake air amount Mc(k−N) for the cycle the N cycles before the present time by the target upstream-side air-fuel ratio abyfr.

$$Fcr(k-N)=Mc(k-N)/abyfr \quad (5)$$

It should be noted that the target upstream-side air-fuel ratio abyfr is set at the stoichiometric air-fuel ratio during a normal operating state. On the other hand, the target upstream-side air-fuel ratio abyfr is set at a predetermined air-fuel ratio leaner (in the lean side) than the stoichiometric air-fuel ratio when a lean air-fuel ratio setting condition is satisfied for the purpose of avoiding a generation of an emission odor due to sulfur and so on. The target upstream-side air-fuel ratio abyfr may be set at an air-fuel ratio richer (in the rich side) than the stoichiometric air-fuel ratio when one of following conditions is satisfied.

when an elapsed time after a start of the engine 10 is equal to or shorter than an elapsed time after engine start threshold, when an engine cooling water temperature THW is equal to or lower than an engine cooling water temperature threshold THWth, when a present time is within a predetermined period after a termination of the fuel-cut (fuel supply stop) control, and when an operating condition of the engine 10 is in an operating state (high load operating state) in which an overheat of the upstream-side catalytic converter 43 should be prevented.

Step 1130: The CPU obtains "an error DFc of the cylinder fuel supply amount", according to a formula (6) described below. That is, the CPU obtains the error DFc of the cylinder fuel supply amount by subtracting the cylinder fuel supply amount Fc(k−N) from the target cylinder fuel supply amount Fcr(k−N). The error DFc of the cylinder fuel supply amount represents excess and deficiency of the fuel supplied to the cylinder the N cycle before the present time.

$$DFc=Fcr(k-N)-Fc(k-N) \quad (6)$$

Step 1135: The CPU obtains the main feedback amount DFi, according to a formula (7) described below. In the formula (7) below, Gp is a predetermined proportion gain, and Gi is a predetermined integration gain. Further, "a value SDFc" in the formula (7) is "an integrated value of the error DFc of the cylinder fuel supply amount". That is, the CPU calculates "the main feedback amount DFi" based on a proportional-integral control to have the air-fuel ratio abyfsc for a feedback control coincide with the target air-fuel ratio abyfr.

$$DFi=Gp\cdot DFc+Gi\cdot SDFc \quad (7)$$

Step 1140: The CPU obtains a new integrated value SDFc of the error DFc of the cylinder fuel supply amount by adding the error DFc of the cylinder fuel supply amount obtained at the step 1130 to the current integrated value SDFc of the error DFc of the cylinder fuel supply amount.

As described above, the main feedback amount DFi is obtained based on the proportional-integral control. The main feedback amount DFi is reflected in (onto) the final fuel injection amount Fi by the process of the step 1030 in FIG. 10.

Meanwhile, "a sum of the sub feedback amount Vafsfb and the sub FB learning value Vafsfbg" in the right-hand side of the formula (2) above is small and is limited to a small value, compared to the output value Vabyfs of the upstream-side air-fuel ratio 55. Accordingly, as described later, "the sum of the sub feedback amount Vafsfb and the sub FB learning value Vafsfbg" may be considered as "a supplement correction amount" to have "the output value Voxs of the downstream air-fuel sensor 56" coincide with "a target downstream-side value Voxsref which is a value corresponding to the stoichiometric air-fuel ratio". The air-fuel ratio abyfsc for a feedback control is therefore said to be a value substantially based on the output value Vabyfs of the upstream air-fuel ratio sensor 55. That is, the main feedback amount DFi can be said to be a correction amount to have "the air-fuel ratio of the engine represented by the output value Vabyfs of the upstream air-fuel ratio sensor 55" coincide with "the target upstream-side air-fuel ratio (the stoichiometric air-fuel ratio)".

At the determination of step 1105, if the main feedback condition is not satisfied, the CPU makes a "No" determination to proceed to step 1145 at which the CPU sets the value of the main feedback amount DFi at "0". Subsequently, the CPU stores "0" into the integrated value SDFc of the error of the cylinder fuel supply amount at step 1150. Thereafter, the CPU proceeds to step 1195 to end the present routine tentatively. As described above, when the main feedback condition is not satisfied, the main feedback amount DFi is set to (at) "0". Accordingly, the correction for the base fuel injection amount Fbase with the main feedback amount DFi is not performed.

Calculation of the Sub Feedback Amount and the Sub FB Learning Value>

Figure 12:
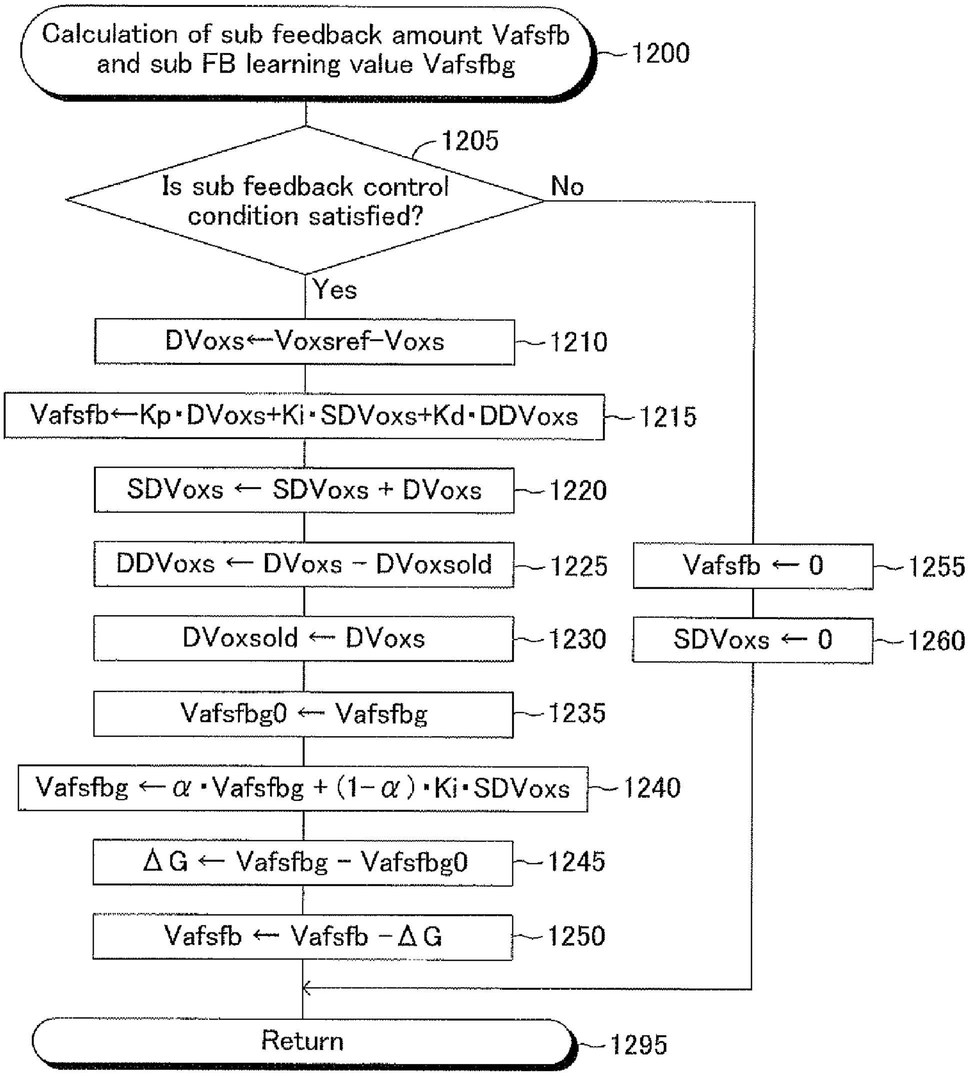
FIG. 12 is a flowchart showing a routine executed by the CPU of the electric controller shown in FIG. 1 for calculating a sub feedback amount and a sub FB learning value.

The CPU repeatedly executes a routine shown in FIG. 12 every time a predetermined time period elapses in order to calculate "the sub feedback amount Vafsfb" and "the learning value (the sub FB learning value) Vafsfbg of the sub feedback amount Vafsfb". Accordingly, at a predetermined timing, the CPU starts the process from step 1200 to proceed to step 1205 at which CPU determines whether or not "a sub feedback control condition is satisfied.

The sub feedback control condition is satisfied when all of the following conditions are satisfied.

(B1) The main feedback control condition is satisfied.

(B2) The downstream air-fuel ratio sensor 56 has been activated.

(B3) The target upstream-side air-fuel ratio is set at the stoichiometric air-fuel ratio.

The description continues assuming that the sub feedback control condition is satisfied. In this case, the CPU makes a "Yes" determination at step 1205 to execute processes from steps 1210 to 1230 described below in this order, to calculate the sub feedback amount Vafsfb.

Step 1210: The CPU obtains "an error amount of output DVoxs" which is a difference between "the target downstream-side value Voxsref" and "the output value Voxs of the downstream air-fuel ratio sensor 56", according to a formula (8) described below. That is, the CPU obtains "the error amount of output DVoxs" by subtracting "the current output value Voxs of the downstream air-fuel ratio sensor 56" from "the target downstream-side value Voxsref". The target downstream-side value Voxsref is set at (to) the value Vst (0.5 V) corresponding to the stoichiometric air-fuel ratio.

$$DVoxs = Voxsref - Voxs \qquad (8)$$

Step 1215: The CPU obtains the sub feedback amount Vafsfb according to a formula (9) described below. In the formula (9) below, Kp is a predetermined proportion gain (proportional constant), Ki is a predetermined integration gain (integration constant), and Kd is a predetermined differential gain (differential constant). The SDVoxs is an integrated value of the error amount of output DVoxs, and the DDVoxs is a differential value of the error amount of output DVoxs.

$$Vafsfb = Kp \cdot DVoxs + Ki \cdot SDVoxs + Kd \cdot DDVoxs \qquad (9)$$

Step 1220: The CPU obtains a new integrated value SDVoxs of the error amount of output DVoxs by adding "the error amount of output DVoxs obtained at the step 1210" to "the current integrated value SDVoxs of the error amount of output".

Step 1225: The CPU obtains a new differential value DDVoxs by subtracting "a previous error amount of the output DVoxsold calculated when the present routine was executed at a previous time" from "the error amount of output DVoxs calculated at the step 1210".

Step 1230: The CPU stores "the error amount of output DVoxs calculated at the step 1210" as "the previous error amount of the output DVoxsold".

In this way, the CPU calculate "the sub feedback amount Vafsfb" according to a proportional-integral-differential (PID) control to have the output value Voxs of the downstream air-fuel ratio sensor 56 coincide with the target downstream-side value. As shown in the formula (2) described above, the sub feedback amount Vafsfb is used to calculate the output value Vabyfsc for a feedback control.

Subsequently, the CPU executes processes from steps 1235 to 1250 described below in this order, to calculate "the sub FB learning value Vafsfbg", and thereafter proceeds to step 1295 to end the present routine tentatively.

Step 1235: The CPU stores "the current sub FB learning value Vafsfbg" as "a before updated learning value Vafsfbg0".

Step 1240: The CPU updates the sub FB learning value Vafsfbg according to a formula (10) described below. Vafsfbg (k+1) which is the left-hand side of the formula (10) is an updated sub FB learning value Vafsfbg. The Value α is a value equal to or larger than 0 and smaller than 1.

$$Vafsfbg(k+1) = \alpha \cdot Vafsfbg + (1-\alpha) \cdot Ki \cdot SDVoxs \qquad (10)$$

As is clear from the formula (10), the sub FB learning value Vafsfbg is a value obtained by performing "a filtering process to eliminate noises" on "the integral term Ki·SDVoxs of the sub feedback amount". In other words, the sub FB learning value Vafsfbg is a value corresponding (according) to the steady-state component (integral term) of the sub feedback amount Vafsfb. The updated sub FB learning value Vafsfbg (=Vafsfbg(k+1)) is stored in the backup RAM.

Step 1245: The CPU calculates a change amount (update amount) ΔG of the sub FB learning value Vafsfbg, according to a formula (11) described below.

$$\Delta G = Vafsfbg - Vafsfbg0 \qquad (11)$$

Step 1250: The CPU corrects the sub feedback amount Vafsfb with the change amount ΔG, according to a formula (12) described below.

$$Vafsfb = Vafsfb - \Delta G \qquad (12)$$

The processes of step 1245 and step 1250 will be described. As shown in the formula (2), the CPU obtains the output value Vabyfsc for a feedback control by adding "the sub feedback amount Vafsfb and the sub FB learning value Vafsfbg" to "the output value Vabyfs of the upstream air-fuel ratio sensor 55". The sub FB learning value Vafsfbg is a value capturing a portion of the integral term Ki·SDVoxs (the steady-state component) of the sub feedback amount Vafsfb. Accordingly, when the sub FB learning value Vafsfbg is changed (updated), and if the sub feedback amount Vafsfb is not corrected in accordance with the change amount of the sub FB learning value Vafsfbg, a double correction may be made by "the changed (updated) sub FB learning value Vafsfbg and the sub feedback amount Vafsfb". It is therefore necessary to correct the sub feedback amount Vafsfb in accordance with the change amount ΔG of the sub FB learning value Vafsfbg, when the sub FB learning value Vafsfbg is changed.

In view of the above, as shown in the formula (11) above and the formula (12) above, the CPU decreases the sub feedback amount Vafsfb by the change amount ΔG, when the sub FB learning value Vafsfbg is increased by the change amount ΔG. In the formula (11), Vafsfbg0 is the sub FB learning value Vafsfbg immediately before the change (update). Accordingly, the change amount ΔG can be a positive value and a negative value.

With the processes described above, the sub feedback amount Vafsfb and the sub FB learning value Vafsfbg are updated.

In contrast, when the sub feedback control condition is not satisfied, the CPU makes a "No" determination at step 1205 in FIG. 12 to execute processes from steps 1255 to 1260 described below in this order, and then proceed to step 1295 to end the present routine tentatively.

Step 1255: The CPU sets the value of the sub feedback amount Vafsfb at (to) "0".

Step 1260: The CPU sets the value of the integrated value SDVoxs of the error amount of output at (to) "0".

By the processes described above, as is clear from the formula (2) above, the output value Vabyfsc for a feedback control becomes equal to the sum of the output value Vabyfs of the upstream air-fuel ratio sensor 55 and the sub FB learning value Vafsfbg. That is, in this case, "updating the sub feedback amount Vafsfb" and "reflecting the sub feedback amount Vafsfb in (into) the final fuel injection amount Fi" are stopped. It should be noted that the sub FB learning value Vafsfbg corresponding to the integral term of the sub feedback amount Vafsfb is reflected in (into) the final fuel injection amount Fi.

<Determination of the Air-Fuel Ratio Imbalance Among Cylinders>

Processes for performing "the determination of the air-fuel ratio imbalance among cylinders" will next be described. The CPU repeatedly executes "a routine for the determination of the air-fuel ratio imbalance among cylinders" shown in FIG. 13, every time a predetermined time period elapses. Accordingly, at a predetermined timing, the CPU starts the process from step 1300 to proceed to step 1305 at which CPU determines whether or not "a precondition (a determination performing condition) of an abnormality determination (determination of the air-fuel ratio imbalance among cylinders) is satisfied. In other words, if the precondition is not satisfied, "a prohibiting condition for the determination" of the air-fuel ratio imbalance among cylinders is satisfied. When "the prohibiting condition for the determination" of the air-fuel ratio imbalance among cylinders is satisfied, "a determination of the air-fuel ratio imbalance among cylinders" described below using "an imbalance determining parameter calculated based on the sub FB learning value Vafsfbg" is not performed.

The precondition of the abnormality determination (the determination of the air-fuel ratio imbalance among cylinders) is satisfied, when all of conditions from (C1) to (C6) described below are satisfied. It should be noted that the precondition may consist of any combination of one or more conditions from (C1) to (C6).

(C1) The main feedback control condition is satisfied (refer to from A1 to A3 described above).

(C2) An engine operating state of the engine 10 is not in a state in which "an amount of the oxygen included in the exhaust gas discharged from the engine 10" is equal to or greater than an oxygen amount threshold. In other words, the engine operating state of the engine 10 is in a state in which "the amount of the oxygen included in the exhaust gas discharged from the engine 10" is smaller than the oxygen amount threshold.

The reason why the condition (C2) is included is as follows.

When the operating state of the engine 10 is in "the state in which the amount of the oxygen included in the exhaust gas discharged from the engine 10 is equal to or greater than the oxygen amount threshold", there is a possibility that "oxidization of hydrogen included in the exhaust gas" is expedited greatly than expected due to the excessive oxygen included in the exhaust gas before the exhaust gas discharged from the engine 10 reaches the upstream air-fuel ratio sensor 55. When "the oxidization of hydrogen included in the exhaust gas" occurs greatly than expected, the air-fuel ratio abyfs represented by the output value Vabyfs of the upstream air-fuel ratio sensor 55 becomes an air-fuel ratio close to "the true average of the air-fuel ratio of the mixture supplied to the entire engine 10", even when the air-fuel ratio imbalance among cylinders is occurring (i.e., even when a large amount of hydrogen $H_2$ is discharged only from the specific cylinder). As a result, "the imbalance determining parameter" obtained based on the output value Voxs of the downstream air-fuel ratio sensor 56 becomes a value which does not represent the degree of the air-fuel ratio imbalance among cylinders.

The condition (C2) described above may be a condition (C2-1) described below.

(C2-1) The air-fuel ratio of the mixture supplied to the engine 10 is not set at an air-fuel ratio leaner than (or in the lean side with respect to) the stoichiometric air-fuel ratio.

For example, the air-fuel ratio of the mixture supplied to the engine 10 is set at (to) the air-fuel ratio leaner than the stoichiometric air-fuel ratio when the operating state of the engine 10 satisfies an exhaust gas odor preventing condition in order to avoid a generation of an emission odor ($H_2S$) due to sulfur and so on. In this case, "the amount of the oxygen included in the exhaust gas discharged from the engine 10" is equal to or greater than the oxygen amount threshold. For example, setting the air-fuel ratio to the lean side with respect to the stoichiometric air-fuel ratio can be realized by setting the target upstream-side air-fuel ratio abyfr at (to) an air-fuel ratio larger than the stoichiometric air-fuel ratio, or by correcting the sub feedback amount in such a manner that the sub feedback amount is decreased slightly (in a slight amount). In this case, the sub feedback amount Vafsfb may be obtained by setting the target downstream-side value Voxsref at (to) "a value smaller than the value Vst corresponding to the stoichiometric air-fuel ratio by a predetermined slight value $\Delta V$".

The condition (C-2) described above may be replaced with a condition that "the operating state of the engine 10 does not satisfy the exhaust gas odor preventing condition". The exhaust gas odor preventing condition is, for example, satisfied a period within a predetermined time from a timing at which it is determined that a vehicle speed detected by a vehicle speed sensor which is not shown is "0", after a timing at which the throttle valve opening TA is changed from a state in which the throttle valve opening TA is not fully-closed to a state in which the throttle valve opening TA is fully-closed.

(C3) The engine operating state of the engine 10 is not in a state in which "an amount of the hydrogen included in the exhaust gas discharged from the engine 10" is equal to or greater than a hydrogen amount threshold. That is, the engine operating state of the engine 10 is in a state in which "the amount of the hydrogen included in the exhaust gas discharged from the engine 10" is smaller than the hydrogen amount threshold. In other words, this condition is a condition that "a generation amount of hydrogen $H_2$ is stable, because a combustion state of the mixture in the combustion chambers 21 is stable".

The reason why the condition (C3) is included is as follows.

When the operating state of the engine 10 is in "the state in which the amount of the hydrogen included in the exhaust gas discharged from the engine 10 is equal to or greater than the hydrogen amount threshold", the hydrogen is not sufficiently purified in the upstream-side catalytic converter 43, and thus, the hydrogen may flow out to a position downstream of the catalytic converter 43. In this case, it is likely that the output value Voxs of the downstream air-fuel ratio sensor 56 is affected by the preferential diffusion of hydrogen. Alternatively, there is a possibility that the hydrogen is generated temporarily in a specific cylinder, although the air-fuel ratio imbalance among cylinders is not actually occurring due to the characteristic of the injector. Accordingly, it is likely that the imbalance determining parameter obtained based on the output value Voxs of the downstream air-fuel ratio sensor 56 does not indicate a value corresponding to “the true average of the air-fuel ratio which is excessively corrected by the air-fuel ratio feedback control using the output value Vabyfs of the upstream air-fuel ratio sensor 55”.

The condition (C3) described above may be a condition (C3-A) described below.

(C3-A) The air-fuel ratio of the mixture supplied to the engine 10 is not set at “an air-fuel ratio richer than (or in the riche side with respect to) the stoichiometric air-fuel ratio”. The “setting the air-fuel ratio of the mixture supplied to the engine at (to) the rich side with respect to the stoichiometric air-fuel ratio” may be realized by setting the target upstream-side air-fuel ratio abyfr at (to) an air-fuel ratio in the rich side with respect to the stoichiometric air-fuel ratio, or by correcting the sub feedback amount in such a manner that the sub feedback amount is increased slightly (e.g., changing the target downstream-side value Voxsref at (to) a value slightly larger than the value corresponding to the stoichiometric air-fuel ratio).

The condition (C3) may consist of at least one of conditions of (C3-1) to (C3-4) described below. In other words, the condition (C3) is designed to be satisfied, when all of “any combination of the conditions” of (C3-1) to (C3-4) is/are satisfied.

(C3-1) An elapsed time after the start of the engine 10 is neither equal to nor shorter than an elapsed time after engine start threshold. That is, the elapsed time after the start of the engine 10 is longer than the elapsed time after engine start threshold.

(C3-2) The cooling water temperature THW of the engine 10 is neither equal to nor lower than an engine cooling water temperature threshold THWth. That is, the cooling water temperature THW of the engine 10 is higher than the engine cooling water temperature threshold THWth.

(C3-3) An elapsed time TRS after a timing at which an engine state is changed from a state in which the air-fuel ratio of the mixture supplied to the engine 10 is set at “an air-fuel ratio richer than the stoichiometric air-fuel ratio” to a state in which the air-fuel ratio of the mixture supplied to the engine 20 is set at “the stoichiometric air-fuel ratio” is neither equal to nor shorter than a predetermined time TRSth. That is, the elapsed time TRS is longer than the predetermined time TRSth.

(C3-4) “An integrated value SRS of an amount of the intake air introduced into the engine 10” after the timing at which the engine state is changed from “the state in which the air-fuel ratio of the mixture supplied to the engine 10 is set at the air-fuel ratio richer than the stoichiometric air-fuel ratio” to “the state in which the air-fuel ratio of the mixture supplied to the engine is set at the stoichiometric air-fuel ratio” is neither equal to nor larger than an integrated air amount threshold after fuel amount increase stop SRSth. That is, the integrated value SRS of the intake air amount SRS is larger than the integrated air amount threshold after fuel amount increase stop SRSth.

When the conditions of (C3-1) to (C3-4) and so on are not satisfied, “the generation amount of hydrogen $H_2$” is not stable (and thus, may become excessive), because the combustion state of the mixture is not stable. Accordingly, the amount of hydrogen included in the exhaust gas of the engine 10 is not stable, and it is therefore likely that, if the air-fuel ratio imbalance determination among cylinders is carried out under these states, the determination is erroneous.

(C4) A purifying ability to oxidize hydrogen of the upstream-side catalytic converter 43 is neither equal to nor smaller than a first predetermined ability. That is, the purifying ability to oxidize hydrogen of the upstream-side catalytic converter 43 is larger than the first predetermined ability. In other words, this condition is a condition that “the upstream-side catalytic converter 43 is in the state in which the upstream-side catalytic converter 43 can purify hydrogen flowed into the upstream-side catalytic converter 43 in an amount larger than a predetermined amount (that is, it is in a state of being capable of purifying hydrogen)”.

The reason why the condition (C4) is included is as follows.

When the purifying ability to oxidize hydrogen of the catalytic converter 43 is equal to or smaller than the first predetermined ability, the hydrogen can not be purified sufficiently in the catalytic converter 43, and therefore, the hydrogen may flow out to the position downstream of the upstream-side catalytic converter 43. Consequently, the output value Voxs of the downstream air-fuel ratio sensor 56 may be affected by the preferential diffusion of hydrogen, or an air-fuel ratio at the position downstream of the upstream-side catalytic converter 43 may not coincide with “the true average of the air-fuel ratio of the mixture supplied to the entire engine 10”. Accordingly, it is likely that the output value Voxs of the downstream air-fuel ratio sensor 56 does not correspond to “the true average of the air-fuel ratio which is excessively corrected by the air-fuel ratio feedback control using the output value Vabyfs of the upstream air-fuel ratio sensor 55”. Therefore, if the air-fuel ratio imbalance determination among cylinders is carried out under the state, it is likely that the determination is erroneous.

The condition (C4) may consist of at least one of conditions of (C4-1) to (C4-6) described below. In other words, the condition (C4) is designed to be satisfied, when all of “any combination of the conditions” of (C4-1) to (C4-6) is/are satisfied.

(C4-1) An oxygen storage amount of the upstream-side catalytic converter 43 is neither equal to nor smaller than a first oxygen storage amount threshold. That is, the oxygen storage amount of the upstream-side catalytic converter 43 is larger than the first oxygen storage amount threshold. In this case, it is possible to determine that the purifying ability to oxidize hydrogen of the upstream-side catalytic converter 43 is larger than the first predetermined ability.

It should be noted that the oxygen storage amount of the upstream-side catalytic converter 43 can be obtained according to a well-known method. For example, the oxygen storage amount OSA of the upstream-side catalytic converter 43 is obtained by adding an amount corresponding to an excessive amount of oxygen flowing into the upstream-side catalytic converter 43 to the oxygen storage amount OSA, and subtracting an amount corresponding to an excessive amount of unburnt substances flowing into the upstream-side catalytic converter 43 from the oxygen storage amount OSA. That is, the oxygen storage amount OSA is obtained by obtaining an excess and deficiency amount ΔO2 of oxygen ($\Delta O2=k\cdot mfr\cdot(abyfs-stoich)$) based on a difference between the upstream-side air-fuel ratio abyfs and the stoichiometric air-fuel ratio stoichi every time a predetermined time elapses (k is a ratio of oxygen to atmosphere, 0.23; mfr is an amount of fuel supplied for the predetermined time), and by integrating the excess and deficiency amount ΔO2 (refer to Japanese Patent Application Laid-Open No. 2007-239700, Japanese Patent Application Laid-Open No. 2003-336535, and Japanese Patent Application Laid-Open No. 2004-036475, etc.). It should be noted that the thus obtained oxygen storage amount OSA is limited to a value between the maximum oxygen storage amount Cmax of the upstream-side catalytic converter 43 and "0".

(C4-2) An integrated value (after-engine-start-integrated-air-amount) of an amount of the intake air introduced into the engine 10 after a start of the engine 10 is neither equal to nor smaller than an after-engine-start-integrated-air-amount threshold. That is, the after-engine-start-integrated-air-amount is larger than the after-engine-start-integrated-air-amount threshold. The reason why this condition is provided is as follows. That is, when the after-engine-start-integrated-air-amount is smaller than the after-engine-start-integrated-air-amount threshold, the exhaust gas of an amount which is sufficient to activate the upstream-side catalytic converter 43 has not flowed into the upstream-side catalytic converter 43, and accordingly, it is possible to determine that the purifying ability to oxidize hydrogen of the upstream-side catalytic converter 43 is equal to or smaller than the first predetermined ability.

(C4-3) A time for which a state of the throttle valve 34 is a fully-closed state (a time for which the throttle valve opening TA is continuously "0") is neither equal to nor longer than an idling time threshold. That is, the time for which the state of the throttle valve 34 is a fully-closed state is shorter than the idling time threshold. When the time for which the state of the throttle valve 34 is the fully-closed state is equal to or longer than the idling time threshold, "the throttle valve fully-closed state" in which a temperature of the exhaust gas is low and an amount of the exhaust gas is small continues for a long time, and thus, a temperature of the upstream-side catalytic converter 43 lowers, and accordingly, it is possible to determine that the purifying ability to oxidize hydrogen of the upstream-side catalytic converter 43 is equal to or smaller than the first predetermined ability.

(C4-4) An elapsed time after a timing at which the state of the throttle valve 34 is changed to a state other than the fully-closed state (i.e., an idling off time which is the elapsed time after the timing at which the throttle valve opening TA is changed to "a value other than 0" from "0") is neither equal to nor shorter than an idling-off time threshold. That is, the idling off time is longer than the idling-off time threshold. When the idling off time is equal to or shorter than the idling-off time threshold, the temperature of the upstream-side catalytic converter 43 which lowered during the throttle-valve-fully-closed state does not reach (is not go back to) a sufficient temperature, and accordingly, it is possible to determine that the purifying ability to oxidize hydrogen of the upstream-side catalytic converter 43 is equal to or smaller than the first predetermined ability.

(C4-5) It is determined that the upstream-side catalytic converter 43 is in the activity state. When the upstream-side catalytic converter 43 is in the inactivity state, it is possible to determine that the purifying ability to oxidize hydrogen of the upstream-side catalytic converter 43 is equal to or smaller than the first predetermined ability. It should be noted that whether or not the condition (C4-5) is satisfied can be determined by, for example, estimating an exhaust gas temperature based on the operating condition of the engine 10, estimating the temperature of the upstream-side catalytic converter 43 based on the estimated exhaust gas temperature, an exhaust gas amount, and so on, and thereafter, determining whether or not the estimated temperature of the upstream-side catalytic converter 43 is equal to or higher than the predetermined activation temperature threshold.

(C4-6) It is not determined that the upstream-side catalytic converter 43 is in an abnormal state (it is determined that the upstream-side catalytic converter 43 is in a normal state). When it is determined that the upstream-side catalytic converter 43 is in the abnormal state, it is possible to clearly determine that the purifying ability to oxidize hydrogen of the upstream-side catalytic converter 43 is equal to or smaller than the first predetermined ability. It should be noted that whether or not the upstream-side catalytic converter 43 in the abnormal state can be determined according to a well know method. For example, it can be determined that the upstream-side catalytic converter 43 is in the abnormal state, when the output value Voxs of the downstream air-fuel ratio sensor has never reversed yet, even though a sufficient time has elapsed after the engine start. Alternatively, it can be determined that the upstream-side catalytic converter 43 is in the abnormal state, when the maximum oxygen storage amount Cmax of the upstream-side catalytic converter 43 is equal to or smaller than a threshold.

The maximum oxygen storage amount Cmax of the upstream-side catalytic converter 43 can be obtained by, for example, setting the target upstream-side air-fuel ratio abyfr at (to) the air-fuel ratio leaner than (in the leaner side with respect to) the stoichiometric air-fuel ratio, when the output value Voxs of the downstream-side air-fuel ratio sensor 56 becomes a value corresponding to an air-fuel ratio richer than the stoichiometric air-fuel ratio (i.e., at a rich-reversal timing) after setting the target upstream-side air-fuel ratio abyfr at (to) an air-fuel ratio richer than (in a richer side with respect to) the stoichiometric air-fuel ratio, and integrating an oxygen amount flowing into the upstream-side catalytic converter 43 from the rich-reversal timing until the output value Voxs of the downstream-side air-fuel ratio sensor 56 becomes a value corresponding to the air-fuel ratio leaner than the stoichiometric air-fuel ratio (i.e., at a lean-reversal timing).

(C5) The purifying ability to oxidize hydrogen of the upstream-side catalytic converter 43 is neither equal to nor larger than a second predetermined ability. That is, the purifying ability to oxidize hydrogen of the upstream-side catalytic converter 43 is smaller than the second predetermined ability. The second predetermined ability is larger than the first predetermined ability.

The reason why the condition (C5) is included is as follows.

When the purifying ability to oxidize hydrogen of the upstream-side catalytic converter 43 is equal to or larger than the second predetermined ability, there is a possibility that the average of the air-fuel ratio of the exhaust gas flowing out from the upstream-side catalytic converter 43 does not correspond to "the true average of the air-fuel ratio which is excessively corrected by the air-fuel ratio feedback control". For example, the oxygen storage amount of the upstream-side catalytic converter 43 is considerably large immediately after the fuel cut control, and therefore, the exhaust gas at the position downstream of the upstream-side catalytic converter 43 does not correspond to "the true average of the air-fuel ratio which is excessively corrected by the air-fuel ratio feedback control". In other words, the imbalance determining parameter becomes a value indicating the degree of the air-fuel ratio imbalance among cylinders with high accuracy, when the purifying ability to oxidize hydrogen of the upstream-side catalytic converter 43 is between the first predetermined ability and the second predetermined ability.

The condition (C5) may consist of at least one of conditions of (C5-1) to (C5-4) described below. In other words, the condition (C5) is designed to be satisfied, when all of "any combination of the conditions" of (C5-1) to (C5-4) is/are satisfied.

(C5-1) The oxygen storage amount of the upstream-side catalytic converter 43 is neither equal to nor larger than a second oxygen storage amount threshold. That is, the oxygen storage amount of the upstream-side catalytic converter 43 is smaller than the second oxygen storage amount threshold. It is possible to determine that the purifying ability to oxidize hydrogen of the upstream-side catalytic converter 43 is larger than the second predetermined ability, when the oxygen storage amount of the upstream-side catalytic converter 43 is larger than the second oxygen storage amount threshold. The second oxygen storage amount threshold is larger than the first oxygen storage amount threshold.

(C5-2) An integrated value of an amount of the intake air introduced into the engine 10 (integrated air amount after fuel cut control) after a fuel-cut operating state of the engine 10 is terminated (fuel cut termination timing) is neither equal to nor smaller than an after-fuel-cut-termination-integrated-air-amount threshold. That is, "the integrated air amount after fuel cut control" is larger than the after-fuel-cut-termination-integrated-air-amount threshold.

(C5-3) An elapsed time after the fuel cut termination timing is neither equal to nor shorter than an after-fuel-cut-termination-elapsed-time threshold. That is, the elapsed time after the fuel cut termination timing is longer than the after-fuel-cut-termination-elapsed-time threshold.

(C5-4) "The number of reversing of the output value Voxs of the downstream air-fuel ratio sensor 56" after the fuel cut termination timing is neither equal to nor smaller than the number of reversing threshold. That is, "the number of reversing of the output value Voxs of the downstream air-fuel ratio sensor 56" is larger than the number of reversing threshold. Here, "the number of reversing of the output value Voxs of the downstream air-fuel ratio sensor 56" is the number of times incremented every time the output value Voxs of the downstream air-fuel ratio sensor 56 cuts across (passes over) the value corresponding to the stoichiometric air-fuel ratio.

When each of the conditions of (C5-2) to (C5-4) described above is not satisfied, the amount of the oxygen which has been accumulated into the upstream-side catalytic converter 43 during the fuel-cut operating state (fuel-supply-stop-operating state) remains excessive, and thus, it is possible to determine that the purifying ability to oxidize hydrogen of the upstream-side catalytic converter 43 is equal to or larger than the second predetermined ability.

It should be noted that the fuel-cut operating state (fuel cut control, fuel-injection-stop-control) is started when a fuel-cut start condition described below is satisfied, and is terminated when a fuel-cut end (termination) condition described below is satisfied, the fuel-cut start condition The throttle valve opening TA is "0" (or the operation amount Accp of the accelerator pedal AP is "0"), and the engine rotational speed NE is equal to or larger than the fuel cut start engine rotational speed NEFCth.

the fuel-cut termination condition

The throttle valve opening TA (or the operation amount Accp of the accelerator pedal) becomes larger than "0" during the fuel-cut operating state, or the engine rotational speed NE becomes smaller than the fuel cut termination engine rotational speed NERTth smaller than the fuel cut start engine rotational speed NEFCth, during the fuel-cut operating state.

(C6) A flow rate of the exhaust gas discharged from the engine 10 is neither equal to nor larger than a flow rate of the exhaust gas threshold. That is, the flow rate of the exhaust gas discharged from the engine 10 is smaller than the flow rate of the exhaust gas threshold.

The reason why the condition (C6) is included is as follows.

When the flow rate of the exhaust gas discharged from the engine 10 is equal to or larger than the flow rate of the exhaust gas threshold, an amount of hydrogen flowing into the upstream-side catalytic converter 43 exceeds the ability to oxidize hydrogen of the upstream-side catalytic converter 43, and therefore, the hydrogen may flow out to the position downstream of the upstream-side catalytic converter 43. Accordingly, it is likely that the output value Voxs of the downstream air-fuel ratio sensor 56 is affected by the preferential diffusion of hydrogen. Alternatively, an air-fuel ratio at the position downstream of the catalytic converter may not coincide with "the true average of the air-fuel ratio of the mixture supplied to the entire engine". Consequently, even when the air-fuel ratio imbalance among cylinders is occurring, it is likely that the output value Voxs of the downstream air-fuel ratio sensor 56 does not correspond to "the true air-fuel ratio which is excessively corrected by the air-fuel ratio feedback control using the output value Vabyfs of the upstream air-fuel ratio sensor 55". Therefore, if the air-fuel ratio imbalance determination among cylinders is carried out under these states, it is likely that the determination is erroneous.

The condition (C6) may consist of at least one of conditions of (C6-1) to (C6-2) described below. In other words, the condition (C6) is designed to be satisfied, when all of "any combination of the conditions" of (C6-1) to (C6-2) is/are satisfied.

(C6-1) The load (load rate KL, the throttle valve opening TA, the operation amount Accp of the accelerator pedal, and the like) of the engine 10 is neither equal to nor larger than a load threshold. That is, the load of the engine 10 is smaller than the load threshold.

(C6-2) An intake air amount of the engine 10 per unit time is neither equal to nor larger than an intake air amount threshold. That is, the intake air amount of the engine 10 per unit time (e.g., the intake air amount Ga measured by the air-flow meter 51) is smaller than the intake air amount threshold.

It is assumed that the precondition of the abnormality determination described above is satisfied. In this case, the CPU makes a "Yes" determination at step 1305 to proceed to step 1310 to determine "whether or not the sub feedback control condition is satisfied (refer to B1-B3 described above) ". When the sub feedback control condition is satisfied, the CPU executes processes steps from step 1315. The processes steps from step 1315 are a portion for the abnormality determination (the determination of the air-fuel ratio imbalance among cylinders). It can therefore be said that the sub feedback control condition constitutes one of "the precondition of the abnormality determination". Further, the sub feedback control condition is satisfied, when the main feedback control condition is satisfied. It can therefore be said that the main feedback control condition also constitutes one of "the precondition of the abnormality determination".

The description continues assuming that the sub feedback control condition is satisfied. In this case, the CPU executes appropriate processes from steps 1315 to 1360 described below.

Step 1315: The CPU determines whether or not the present time is "immediately after a timing (immediate after timing of sub FB learning value update) at which the sub FB learning value Vafsfbg is changed (updated)". When the present time is the time immediately after the timing of sub FB learning value update, the CPU proceeds to step 1320. When the present time is not the time immediately after the timing of sub FB learning value update, the CPU proceeds to step 1395 to end the present routine tentatively.

Step 1320: The CPU increments a value of a learning value cumulative counter Cexe by "1".

Step 1325: The CPU reads the sub FB learning value Vafsfbg calculated by the routine shown in FIG. 12.

Step 1330: The CPU updates a cumulative value Svafsfbg of the sub FB learning value. That is, the CPU adds "the sub FB learning value Vafsfbg read at step 1325" to "the present cumulative value Svafsfbg" in order to obtain the new cumulative value Svafsfbg.

The cumulative value Svafsfbg is set at "0" in an initialization routine which is executed when the ignition key switch is turned to an on position from an off position. Further, the cumulative value Svafsfbg is set at "0" by a process of step 1360 described later. The process of the step 1360 is executed when the abnormality determination (the determination of the air-fuel ratio imbalance among cylinders, steps 1345-1355) is carried out. Accordingly, the cumulative value Svafsfbg is an integrated value of the sub FB learning value in a period in which "the precondition of an abnormality determination is satisfied" after "the engine start or the last execution of the abnormality determination" and in which "the sub feedback control condition is satisfied".

Step 1335: The CPU determines whether or not the value of the learning value cumulative counter Cexe is equal to or larger than a counter threshold Cth. When the value of the learning value cumulative counter Cexe is smaller than the counter threshold Cth, the CPU makes a "No" determination at step 1335 to directly proceed to step 1395 to end the present routine tentatively. In contrast, when the value of the learning value cumulative counter Cexe is equal to or larger than the counter threshold Cth, the CPU makes a "Yes" determination to proceed to step 1340.

Step 1340: The CPU obtains a sub FB learning value average Avesfbg by dividing "the cumulative value Svafsfbg of the sub FB learning value Vafsfbg" by "the learning value cumulative counter Cexe". As described above, the sub FB learning value average Avesfbg is the imbalance determining parameter which increases as the difference between the amount of hydrogen included in the exhaust gas which has not passed through the upstream-side catalytic converter 43 and the amount of hydrogen included in the exhaust gas which has passed through the upstream-side catalytic converter 43 increases.

Step 1345: The CPU determines whether or not the sub FB learning value average Avesfbg is equal to or larger than an abnormality determining threshold Ath. As described above, when the air-fuel ratio non-uniformity (imbalance) among cylinders becomes excessively large, and "the air-fuel ratio imbalance among cylinder" is therefore occurring, the sub feedback amount Vafsfb changes to "the value to correct the air-fuel ratio of the mixture supplied to the engine 10 to the richer side in a great amount, and accordingly, the sub FB learning value average Avesfbg which is the average value of the sub FB learning value Vafsfbg also changes to "the value to correct the air-fuel ratio of the mixture supplied to the engine 10 to the richer side in a great amount (a value equal to or larger than the threshold value Ath).

Accordingly, when the sub FB learning value average Avesfbg is equal to or larger than the abnormality determining threshold value Ath, the CPU makes a "Yes" determination to proceed to step 1350 at which the CPU sets a value of an abnormality occurring flag XIJO at (to) "1". That is, when the value of the abnormality occurring flag XIJO is "1", it is indicated that the air-fuel ratio imbalance among cylinders is occurring. It should be noted that the value of the abnormality occurring flag XIJO is stored in the backup RAM. When the value of the abnormality occurring flag XIJO is set at (to) "1", the CPU may turn on a warning light which is not shown.

On the other hand, when the sub FB learning value average Avesfbg is smaller than the abnormality determining threshold value Ath, the CPU makes a "No" determination at step 1345 to proceed to step 1355. At step 1355, the CPU sets the value of the abnormality occurring flag XIJO at (to) "0" in order to indicate that the air-fuel ratio imbalance among cylinders is not occurring.

Step 1360: The CPU proceeds to step 1360 from either step 1350 or step 1355 to set (reset) the value of the learning value cumulative counter Cexe at (to) "0" and set (reset) the cumulative value Svafsfbg of the sub FB learning value at (to) "0".

It should be noted that, when the CPU executes the process of step 1305 and the precondition of the abnormal determination is not satisfied, the CPU directly proceeds to step 1395 to end the present routine tentatively. Further, when the CPU executes the process of step 1310 and the sub feedback control condition is not satisfied, the CPU directly proceeds to step 1395 to end the present routine tentatively.

As described above, according to one of the embodiments of the determining apparatus of the present invention, determination of the air-fuel ratio imbalance among cylinders is not carried out, when the various determining prohibiting conditions are satisfied. It is therefore possible to determine whether or not the air-fuel ratio imbalance among cylinders is occurring with high accuracy. It should be noted that various modifications may be adopted without departing from the scope of the invention. For example, the upstream-side catalytic converter 43 may be a catalytic converter (e.g., an oxidation catalyst) which can oxidize hydrogen $H_2$, and may be a catalytic element which is provided to cover the downstream air-fuel ratio sensor 56. The catalytic converter is not limited to the converter which oxidizes hydrogen $H_2$ by so called "the catalytic function", but may include an apparatus to heat the exhaust gas again and supplies a second air to the exhaust passage so as to oxidize hydrogen.

In addition, the sub FB learning value average Avesfbg is obtained as the imbalance determining parameter, however, "the sub FB learning value itself or the average of the sub feedback amount Vafsfb" may be obtained as the imbalance determining parameter.

Furthermore, the above determining apparatus can be expressed as follows.

"An air-fuel ratio imbalance among cylinders determining apparatus, applied to the multi-cylinder internal combustion engine 10 (multi-cylinder internal combustion engine in which each of injectors supplying a fuel in response to the injection instruction signal to each of the cylinders is provided for each of the cylinders (the corresponding intake manifold, or the corresponding combustion chamber)), comprising:

the catalytic converter (the upstream-side catalytic converter 43) capable of oxidizing at least hydrogen among components included in the exhaust gas discharged from the engine 10;

the upstream air-fuel ratio sensor 55, including the diffusion resistance layer **55*d* with which the exhaust gas, which has not passed through the catalytic converter (the upstream-side catalytic converter 43), contacts, and the air-fuel ratio detecting element which is covered by the diffusion resistance layer 55*d* and outputs the output value corresponding to the air-fuel ratio of the exhaust gas which has reached the air-fuel ratio detecting element after passing through the diffusion resistance layer 55*d*;**

the downstream air-fuel ratio sensor 56 which outputs the output value according to the air-fuel ratio of the exhaust gas which has passed through the catalytic converter (the upstream-side catalytic converter 43);

air-fuel ratio feedback control means (FIGS. 10-12) for performing the feedback control on the air-fuel ratio of the mixture supplied to the engine in such a manner that the air-fuel ratio abyfs represented by the output value Vabyfs of the upstream air-fuel ratio sensor 55 coincides with (becomes equal to) the predetermined target upstream-side air-fuel ratio abyfr;

imbalance determining parameter obtaining means (refer to steps 1320-1340, and so on) for obtaining the imbalance determining parameter (the sub FB learning value average Avesfbg) which becomes larger as "the difference between the amount of hydrogen included in the exhaust gas before passing through the catalytic converter and the amount of hydrogen included in the exhaust gas after passing through the catalytic converter" becomes larger, based on the output value of the downstream air-fuel ratio sensor when the feedback control is being performed;

air-fuel ratio imbalance among cylinders determining means (refer to step 1345, and so on) for determining that the imbalance among "individual air-fuel ratios each of which is the air-fuel ratio of the mixture supplied to each of the plurality of cylinders" is occurring, when the obtained imbalance determining parameter (the sub FB learning value average Avesfbg) is larger than the abnormality determining threshold (Ath); and determining prohibiting means (refer to step 1305, step 1310, and so on) for determining whether or not the predetermined determining prohibiting condition is satisfied, and prohibiting determining by the air-fuel ratio imbalance among cylinders determining means when the predetermined determining prohibiting condition is satisfied."

Further, the air-fuel ratio feedback control means includes main feedback amount calculating means (refer to FIG. 11) for calculating the main feedback amount to perform the feedback control of the air-fuel ratio of the mixture supplied to the engine 10 in such a manner that the air-fuel ratio abyfs represented by the output value Vabyfs of the upstream air-fuel ratio sensor 55 coincides with the predetermined target upstream-side air-fuel ratio abyfr, sub feedback amount calculating means (refer to FIG. 12) for calculating the sub feedback amount to perform the feedback control of the air-fuel ratio of the mixture supplied to the engine 10 in such a manner that the air-fuel ratio represented by the output value Voxs of the downstream air-fuel ratio sensor 56 coincides with the stoichiometric air-fuel ratio, and fuel amount control means (refer to FIG. 10, especially step 1030) for controlling the amount of the fuel to be included in the mixture supplied to the engine, based on the main feedback amount and the sub feedback amount, and the imbalance determining parameter obtaining means (refer to FIGS. 12 and 13, steps 1320-1340, and so on) is configured in such a manner that it calculates the imbalance determining parameter based on the sub feedback amount.

Figure 13:
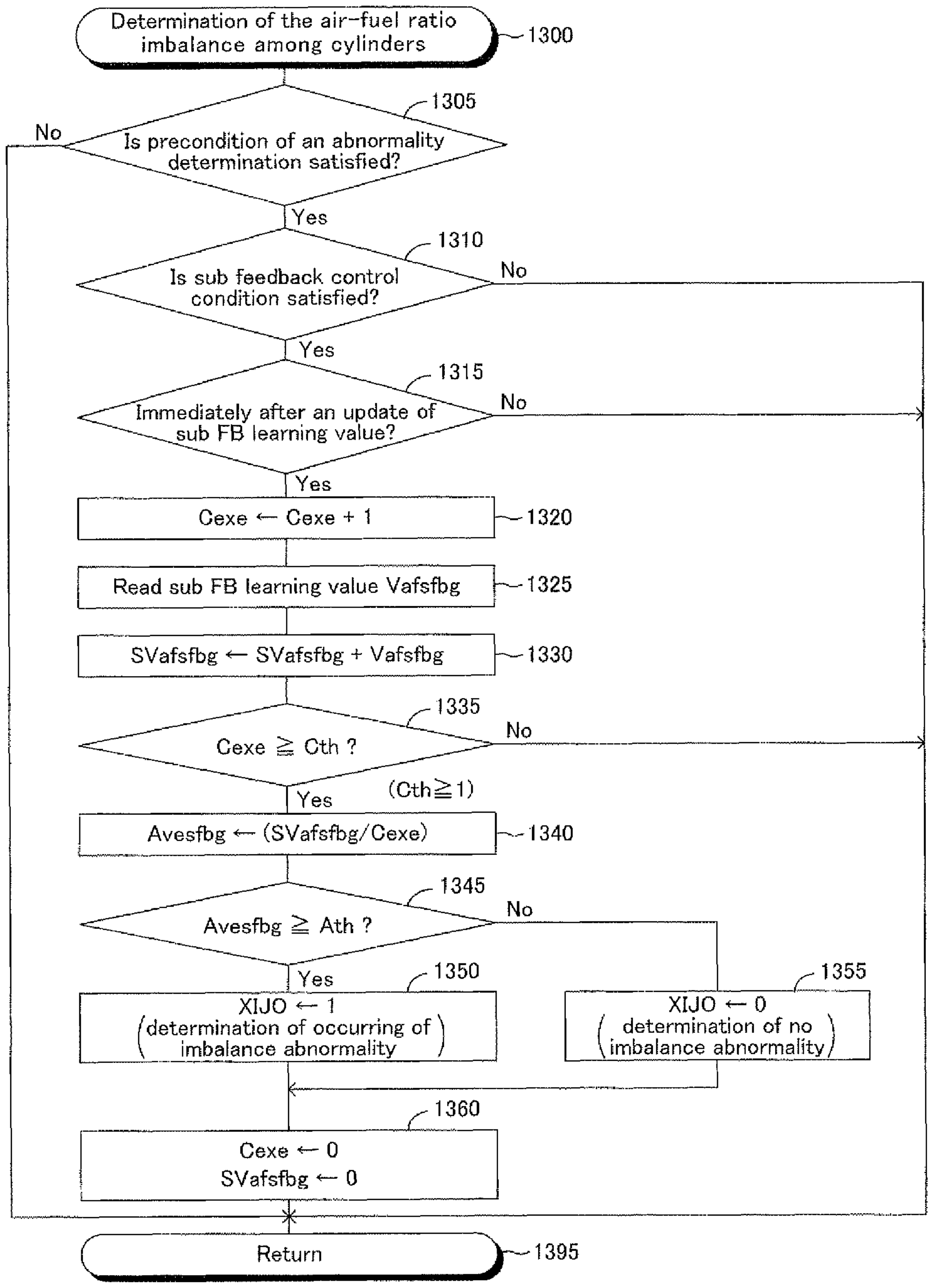
FIG. 13 is a flowchart showing a routine executed by the CPU of the electric controller shown in FIG. 1 for performing a determination of the air-fuel ratio imbalance among cylinders.

Further, the imbalance determining parameter obtaining means is configured so as to obtain the value (the sub FB learning value average Avesfbg) corresponding to the steady-state component included in the sub feedback amount (that is, the value corresponding to "the integral term Ki SDVoxs of the sub feedback amount Vafsfb" which is a base for the sub FB learning value Vafsfbg) as the imbalance determining parameter (refer to FIG. 12, steps 1320-1340 of FIG. 13, and so on).

In addition, the sub feedback amount calculating means is configured so as to include learning means configured so as to perform learning by updating the learning value of the sub feedback amount based on the value corresponding to the steady-state component (the integral term Ki·SDVoxs) included in the sub feedback amount (refer to step 1240, and so on), and so as to correct the sub feedback amount according to the updated learning value (refer to step 1235, step 1245, step 1250, and so on), the fuel amount control means is configured so as to control the amount of the fuel to be included in the mixture supplied to the engine, based on the learning value of the sub feedback amount in addition to the main feedback amount and the sub feedback amount (refer to step 1110, and so on), and the imbalance determining parameter obtaining means is configured so as to calculate the imbalance determining parameter based on the learning value of the sub feedback amount (refer to FIG. 12, steps 1320-1340 of FIG. 13, and so on).

The sub feedback control by the determining apparatus described above is a control in which the air-fuel ratio abyfs detected by the upstream air-fuel ratio sensor 55 is substantially corrected in such a manner that the output value Voxs of the downstream air-fuel ratio sensor 56 coincides with the target downstream value Voxsref (refer to the formula (2) above). In contrast, the sub feedback control may be a control in which an air-fuel ratio correction coefficient calculated based on the output of the upstream air-fuel ratio sensor 55 is adjusted based on a sub feedback amount obtained by a proportional integral control on the output value Voxs of the downstream air-fuel ratio sensor 56, as disclosed in Japanese Patent Application Laid-Open No. Hei 6-010738.

Furthermore, the determining apparatus (the air-fuel ratio control apparatus) may be as follows, as disclosed in Japanese Patent Application Laid-Open No. 2007-77869, Japanese Patent Application Laid-Open No. 2007-146661, and Japanese Patent Application Laid-Open No. 2007-162565. The apparatus calculates a main feedback amount KFmain by high-pass filtering a difference between the upstream-side air-fuel ratio abyfs obtained based on the output value abyfs of the upstream air-fuel ratio sensor 55 and the target upstream-side air-fuel ratio abyfr. The apparatus obtains a sub feedback amount Fisub by performing a proportional-integral process on a value obtained by low-pass filtering an error between the output value Voxs of the downstream air-fuel ratio sensor 56 and the target downstream value Voxsref. In this case, as described in a formula (14) below, the final fuel injection amount Fi may be obtained by correcting the base fuel injection amount Fbase using these feedback amounts in a mode in which these feedback amounts are obtained and used independently from each other.

$$Fi = KF\text{main}\cdot F\text{base} + Fi\text{sub} \tag{14}$$

Moreover in the routine shown in FIG. 13, the CPU directly proceeds to step 1395 when the CPU makes a "No" determination at step 1305. To the contrary, the CPU may proceed to step 1360 when the CPU makes a "No" determination at step 1305. According to this, the data which have been obtained are discarded, when the precondition of the abnormality determination becomes unsatisfied (determining prohibiting condition become satisfied) even once until the sub FB learning value average Avesfbg which is the imbalance determining parameter is obtained.

In addition, the determining apparatus may prohibit the determination of the air-fuel ratio imbalance among cylinders, while an active air-fuel ratio control is being performed by presuming that the determining prohibiting condition is satisfied. The active air-fuel ratio control is a control in which the target upstream-side air-fuel ratio abyfr is changed alternately between "an air-fuel ratio which is richer by Δ AF than the stoichiometric air-fuel ratio" and "an air-fuel ratio which is leaner by Δ AF than the stoichiometric air-fuel ratio", similarly to the case when the maximum oxygen storage amount Cmax is obtained as described above.

The invention claimed is:

1. An air-fuel ratio imbalance among cylinders determining apparatus, applied to a multi-cylinder internal combustion engine having a plurality of cylinders comprising:

a catalytic converter capable of oxidizing at least hydrogen among components included in an exhaust gas discharged from said engine;

an upstream air-fuel ratio sensor, including a diffusion resistance layer with which said exhaust gas, which has not passed through said catalytic converter, contacts, and an air-fuel ratio detecting element which is covered by said diffusion resistance layer and outputs an output value according to an air-fuel ratio of said exhaust gas which has reached said air-fuel ratio detecting element after passing through said diffusion resistance layer;

a downstream air-fuel ratio sensor which outputs an output value according to an air-fuel ratio of said exhaust gas which has passed through said catalytic converter;

air-fuel ratio feedback control means for performing a feedback control on an air-fuel ratio of a mixture supplied to said engine in such a manner that an air-fuel ratio represented by said output value of said upstream air-fuel ratio sensor coincides with a predetermined target upstream-side air-fuel ratio;

air-fuel ratio imbalance among cylinders determining means for obtaining, based on said output value of said downstream air-fuel ratio sensor while said feedback control is being performed, an imbalance determining parameter which becomes larger as a difference between an amount of hydrogen included in said exhaust gas which has not passed through said catalytic converter and an amount of hydrogen included in said exhaust gas which has passed through said catalytic converter becomes larger, and determining that an imbalance among individual air-fuel ratios each of which is an air-fuel ratio of a mixture supplied to each of said plurality of cylinders is occurring, when said obtained imbalance determining parameter is larger than an abnormality determining threshold; and determining prohibiting means for determining whether or not a predetermined determining prohibiting condition is satisfied, and prohibiting said determination performed by said air-fuel ratio imbalance among cylinders determining means when said predetermined determining prohibiting condition is satisfied, wherein, said air-fuel ratio feedback control means includes main feedback amount calculating means for calculating a main feedback amount to perform said feedback control of said air-fuel ratio of said mixture supplied to said engine in such a manner that said air-fuel ratio represented by said output value of said upstream air-fuel ratio sensor coincides with said target upstream-side air-fuel ratio, when a predetermined main feedback control condition is satisfied;

sub feedback amount calculating means for calculating a sub feedback amount to perform said feedback control of said air-fuel ratio of said mixture supplied to said engine in such a manner that an air-fuel ratio represented by said output value of said downstream air-fuel ratio sensor coincides with a stoichiometric air-fuel ratio, when a predetermined sub feedback control condition is satisfied; and fuel amount control means for controlling an amount of a fuel to be included in said mixture supplied to said engine, based on said main feedback amount and said sub feedback amount, and said air-fuel ratio balance among cylinders determining means is configured so as to calculate said imbalance determining parameter based on said sub feedback amount;

said predetermined determining prohibiting condition is satisfied, even when both of said main feedback control condition and said sub feedback control condition are satisfied; and said determining prohibiting means is configured so as to prohibit said determination performed by said air-fuel ratio imbalance among cylinders determining means when said determining prohibiting condition is satisfied, even if both of said main feedback control condition and said sub feedback control condition are satisfied.

2. The air-fuel ratio imbalance among cylinders determining apparatus according to claim 1, wherein, said determining prohibiting condition monitored by said determining prohibiting means is defined to be satisfied when an operating state of said engine is in a state in which an amount of oxygen included in said exhaust gas discharged from said engine is equal to or greater than an oxygen amount threshold.

3. The air-fuel ratio imbalance among cylinders determining apparatus according to claim 2, wherein, said determining prohibiting means is configured in such a manner that said determining prohibiting means determines that said operating state of said engine is in said state in which said amount of oxygen included in said exhaust gas discharged from said engine is equal to or greater than said oxygen amount threshold, when said air-fuel ratio of said mixture supplied to said engine is set at an air-fuel ratio leaner than the stoichiometric air-fuel ratio.

4. The air-fuel ratio imbalance among cylinders determining apparatus according to claim 1, wherein, said determining prohibiting condition monitored by said determining prohibiting means is defined to be satisfied when an operating state of said engine is in a state in which an amount of hydrogen included in said exhaust gas discharged from said engine is equal to or greater than a hydrogen amount threshold.

5. The air-fuel ratio imbalance among cylinders determining apparatus according to claim 4, wherein, said determining prohibiting means is configured in such a manner that said determining prohibiting means determines that said operating state of said engine is in said state in which said amount of hydrogen included in said exhaust gas discharged from said engine is equal to or greater than said hydrogen amount threshold, when said air-fuel ratio of said mixture supplied to said engine is set at an air-fuel ratio richer than the stoichiometric air-fuel ratio.

6. The air-fuel ratio imbalance among cylinders determining apparatus according to claim 4, wherein, said determining prohibiting means is configured in such a manner that said determining prohibiting means determines that said operating state of said engine is in said state in which said amount of hydrogen included in said exhaust gas discharged from said engine is equal to or greater than said hydrogen amount threshold, when at least one of a condition that an elapsed time after a start of said engine is equal to or shorter than an elapsed time after engine start threshold;

a condition that a temperature of a cooling water of said engine is equal to or lower than an cooling water temperature threshold; and a condition that an elapsed time after a timing at which said operating state of said engine is changed from a state in which said air-fuel ratio of said mixture supplied to said engine is set at an air-fuel ratio richer than the stoichiometric air-fuel ratio to a state in which said air-fuel ratio of said mixture supplied to said engine is set at the stoichiometric air-fuel ratio is equal to or shorter than a predetermined time;

is satisfied.

7. The air-fuel ratio imbalance among cylinders determining apparatus according to claim 1, wherein, said determining prohibiting condition monitored by said determining prohibiting means is defined to be satisfied when a purifying ability to oxidize hydrogen of said catalytic converter is equal to or smaller than a first predetermined ability.

8. The air-fuel ratio imbalance among cylinders determining apparatus according to claim 7, wherein, said determining prohibiting means is configured in such a manner that said determining prohibiting means determines that said purifying ability to oxidize hydrogen of said catalytic converter is equal to or smaller than said first predetermined ability, when at least one of a condition that an oxygen storage amount of said catalytic converter is equal to or smaller than a first oxygen storage amount threshold;

a condition that an integrated value of an amount of the intake air introduced into said engine after a start of said engine is equal to or smaller than an after-engine-start-integrated-air-amount threshold;

a condition that a time for which a state of a throttle valve of said engine is a fully-closed state is equal to or longer than an idling time threshold;

condition that an elapsed time after a timing at which said state of said throttle valve of said engine is changed to a state other than said fully-closed state is equal to or shorter than an idling-off time threshold, a condition that it is determined that said catalytic converter is not in an activity state; and a condition that it is determined that said catalytic converter is in an abnormal state;

is satisfied.

9. The air-fuel ratio imbalance among cylinders determining apparatus according to claim 1, wherein, said determining prohibiting condition monitored by said determining prohibiting means is defined to be satisfied when a purifying ability to oxidize hydrogen of said catalytic converter is equal to or larger than a second predetermined ability.

10. The air-fuel ratio imbalance among cylinders determining apparatus according to claim 9, wherein, said determining prohibiting means is configured in such a manner that said determining prohibiting means determines that said purifying ability to oxidize hydrogen of said catalytic converter is equal to or larger than said second predetermined ability, when at least one of a condition that an oxygen storage amount of said catalytic converter is equal to or larger than a second oxygen storage amount threshold;

a condition that an integrated value of an amount of an intake air introduced into said engine after a fuel-cut operating state is terminated is equal to or smaller than an after-fuel-cut-termination-integrated-air-amount threshold;

a condition that an elapsed time after said fuel-cut operating state is terminated is equal to or shorter than an after-fuel-cut-termination-elapsed-time threshold; and a condition that the number of reversing which is the number of times incremented every time said output value of said downstream air-fuel ratio sensor cuts across a value corresponding to the stoichiometric air-fuel ratio after said fuel-cut operating state is terminated is equal to or smaller than the number of reversing threshold;

is satisfied.

11. The air-fuel ratio imbalance among cylinders determining apparatus according to claim 1, wherein, said determining prohibiting condition monitored by said determining prohibiting means is defined to be satisfied when a flow rate of said exhaust gas discharged from said engine is equal to or larger than a flow rate of the exhaust gas threshold.

12. The air-fuel ratio imbalance among cylinders determining apparatus according to claim 11, wherein, said determining prohibiting means is configured in such a manner that said determining prohibiting means determines that said flow rate of said exhaust gas discharged from said engine is equal to or larger than said flow rate of the exhaust gas threshold, when at least one of a condition that a load of said engine is equal to or larger than a load threshold; and a condition that an intake air amount of said engine per unit time is equal to or larger than an intake air amount threshold;

is satisfied.

13. The air-fuel ratio imbalance among cylinders determining apparatus according to claim 1, wherein, said catalytic converter is disposed in an exhaust gas passage and at a position downstream of an exhaust gas aggregated portion of said plurality of cylinders;

said upstream air-fuel ratio sensor is disposed in said exhaust gas passage, and at a position downstream of an exhaust gas aggregated portion and upstream of said catalytic converter; and said downstream air-fuel ratio sensor is disposed in said exhaust gas passage and at a position downstream of said catalytic converter.

14. The air-fuel ratio imbalance among cylinders determining apparatus according to claim 1, wherein, said air-fuel ratio imbalance among cylinders determining means is configured so as to obtain a value corresponding to a steady-state component included in said sub feedback amount as said imbalance determining parameter.

15. The air-fuel ratio imbalance among cylinders determining apparatus according to claim 1, wherein, said sub feedback amount calculating means is configured so as to include learning means for performing learning by updating a learning value of said sub feedback amount based on a steady-state component included in said sub feedback amount and correcting said sub feedback amount according to said updated learning value;

said fuel amount control means is configured so as to control said amount of said fuel to be included in said mixture supplied to said engine, based on said learning value of said sub feedback amount in addition to said main feedback amount and said sub feedback amount; and said air-fuel ratio imbalance among cylinders determining means is configured so as to calculate said imbalance determining parameter based on said learning value of said sub feedback amount.

* * * * *